United States Patent
Markman

(10) Patent No.: US 7,907,691 B2
(45) Date of Patent: Mar. 15, 2011

(54) DUAL-MODE EQUALIZER IN AN ATSC-DTV RECEIVER

(75) Inventor: Ivonete Markman, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1085 days.

(21) Appl. No.: 11/579,690

(22) PCT Filed: May 11, 2005

(86) PCT No.: PCT/US2005/016517
§ 371 (c)(1),
(2), (4) Date: Nov. 6, 2006

(87) PCT Pub. No.: WO2005/112582
PCT Pub. Date: Dec. 1, 2005

(65) Prior Publication Data
US 2008/0291335 A1 Nov. 27, 2008

Related U.S. Application Data

(60) Provisional application No. 60/570,293, filed on May 12, 2004, provisional application No. 60/570,423, filed on May 12, 2004.

(51) Int. Cl.
*H04B 1/10* (2006.01)
(52) U.S. Cl. ......... 375/350; 375/147; 375/152; 375/316; 375/343; 375/232
(58) Field of Classification Search .......... 375/350; 348/725
See application file for complete search history.

(56) References Cited

U.S. PATENT DOCUMENTS

| | | | |
|---|---|---|---|
| 5,063,573 A | 11/1991 | Langewellpott | |
| 5,604,541 A | 2/1997 | Kim et al. | |
| 5,648,987 A | 7/1997 | Yang et al. | |
| 5,706,057 A | 1/1998 | Strolle et al. | |
| 6,175,391 B1 | 1/2001 | Sik | |
| 6,222,592 B1 | 4/2001 | Patel | |
| 6,240,133 B1 | 5/2001 | Sommer et al. | |
| 6,529,559 B2 | 3/2003 | Reshef | |
| 6,693,958 B1 * | 2/2004 | Wang et al. | 375/232 |

(Continued)

FOREIGN PATENT DOCUMENTS

EP 0984577 3/2000

(Continued)

OTHER PUBLICATIONS

"Guide to the Use of the ATSC Digital Television Standard" Oct. 4, 1995, pp. 1-135, XP002968652.

(Continued)

*Primary Examiner* — Shuwang Liu
*Assistant Examiner* — Dhaval Patel
(74) *Attorney, Agent, or Firm* — Robert D. Shedd; Joseph J. Opalach

(57) ABSTRACT

A decision feedback equalizer for processing a data signal provides concurrent equalizer outputs ($Z_{ok}$, $Z_{1k}$) for hard decision directed and soft decision directed modes. The joint architecture in accordance with the present invention takes advantage of the fact, herein recognized, that for each equalizer output symbol soft decision bit representation, a subset of these bits corresponds to the hard decision representation. As a result, the invention permits the concurrent output of two distinct modes with essentially the same hardware as a one output equalizer.

37 Claims, 19 Drawing Sheets

U.S. PATENT DOCUMENTS

| | | | |
|---|---|---|---|
| 6,816,548 B1 * | 11/2004 | Shiue et al. | 375/233 |
| 7,110,449 B2 * | 9/2006 | Heo et al. | 375/233 |
| 2002/0024995 A1 * | 2/2002 | Kim | 375/231 |
| 2002/0051087 A1 | 5/2002 | Limberg et al. | |
| 2007/0104264 A1 * | 5/2007 | Park et al. | 375/233 |

FOREIGN PATENT DOCUMENTS

| | | |
|---|---|---|
| EP | 1014635 | 6/2000 |
| JP | 62226723 | 10/1987 |
| JP | 09008715 | 1/1997 |
| JP | 09233001 | 9/1997 |
| WO | WO03/090348 | 10/2003 |
| WO | WO03090350 | 10/2003 |

OTHER PUBLICATIONS

Search Report dated Dec. 21, 2005.

* cited by examiner

Table One

| mode | status | equalizer coefficient mode control signal |
|---|---|---|
| 0 | 0 | 0 |
| 0 | 2 | 1 |
| 1 | 0 | 2 |
| 1 | 3 | 3 |
| 2 | 0 | 0 |
| 2 | 1 | 1 |
| 2 | 2 | 1 |
| 2 | 3 | (2, 3) |

Table Two

| mode | status | equalizer coefficient mode control signal |
|---|---|---|
| 0 | 0 | 0 |
| 0 | 2 | 1 |
| 1 | 0 | 2 |
| 1 | 3 | 3 |
| 2 | 0 | 2 |
| 2 | 1 | 3 |
| 2 | 2 | 3 |
| 2 | 3 | (2, 3) |

618

DUAL-MODE EQUALIZER IN AN ATSC-DTV RECEIVER

This application is a National Stage Application and claims the benefit, under 35 U.S.C. §365 of International Application PCT/US2005/16517 filed May 11, 2005, which was published in accordance with PCT Article 21(2) on Dec. 1, 2005 in English, and which claims the benefit of U.S. provisional patent application Nos. 60/570,293 and 60/570,423 which were both filed May 12, 2004. This application is related to copending, commonly assigned, U.S. patent application Ser. No. 11/579,967 entitled DUAL-MODE SYNC GENERATOR IN AN ATSC-DTV RECEIVER, filed on Nov. 10, 2006.

BACKGROUND OF THE INVENTION

The present invention generally relates to communications systems and, more particularly, to a receiver.

In modern digital communication systems like the ATSC-DTV (Advanced Television Systems Committee-Digital Television) system (e.g., see, United States Advanced Television Systems Committee, "ATSC Digital Television Standard", Document A/53, Sep. 16, 1995 and "Guide to the Use of the ATSC Digital Television Standard", Document A/54, Oct. 4, 1995), advanced modulation, channel coding and equalization are usually applied. In the receiver, demodulators generally have carrier phase and/or symbol—timing ambiguity. Equalizers are generally a DFE (Decision Feedback Equalizer) type or some variation of it and have a finite length. In severely distorted channels, it is important to know the virtual center of the channel impulse response to give the equalizer the best chance of successfully processing the signal and correcting for distortion. One approach is to use a centroid calculator that calculates the channel virtual center for an adaptive equalizer based on a segment synchronization (sync) signal. Another approach is to use a centroid calculator that calculates the channel virtual center for an adaptive equalizer based on a frame sync signal.

Once the channel virtual center is determined, the reference signals, such as the segment sync signal and the frame sync signal, are locally re-generated in the receiver to line up at the virtual center. As a result, taps will grow in the equalizer to equalize the channel such that the equalized data output will be lined up at the virtual center.

SUMMARY OF THE INVENTION

As noted above, an equalizer is used to correct for distortion. A traditional form of equalization starts the equalizer with a preset non-zero value in the main tap, while all the remaining taps are set equal to values of zero. In contrast, another form of equalization starts the equalizer without a main tap value and all of the taps are set equal to a value of zero. This latter form of equalization provides a potential performance advantage in digital systems like the above-mentioned ATSC-DTV system. However, we have also observed that this potential performance advantage is offset by the need to rely on a training algorithm for initial acquisition, which can negatively impact receiver performance. For example, acquisition in an ATSC receiver can be quite slow since the main training signal, i.e., the ATSC-DTV field sync signal, only repeats every 25 ms (milliseconds).

Therefore, and in accordance with the principles of the invention, a dual-mode equalizer takes advantage of both types of equalization approaches depending on received signal properties. In particular, a receiver comprises an equalizer that has at least two coefficient modes of operation, in a first coefficient mode, the equalizer starts with a preset non-zero value in at least one tap, e.g., the main tap; while in a second coefficient mode, the equalizer starts such that all taps are set equal to the same value, e.g., a value of zero.

In an embodiment of the invention, an ATSC receiver comprises a dual-mode equalizer and a processor. The dual-mode equalizer has two coefficient modes of operation under control of the processor. In a first coefficient mode, the dual-mode equalizer starts with a preset non-zero value in the main tap; while in a second coefficient mode, the dual-mode equalizer starts such that all taps have a value of zero. The processor sets the mode of the dual-mode equalizer as a function of a received ATSC-DTV signal.

In another embodiment of the invention, an ATSC receiver comprises a dual-mode equalizer and a dual-mode synchronization (sync) generator. The dual-mode equalizer has two coefficient modes of operation. In a first coefficient mode, the dual-mode equalizer starts with a preset non-zero value in the main tap; while in a second coefficient mode the dual-mode equalizer starts such that all taps have a value of zero. The mode of the dual-mode equalizer is set as a function of the status of the dual-mode sync generator.

BRIEF DESCRIPTION OF THE DRAWINGS

FIG. 9 shows Table One;
FIG. 10 shows Table Two.

DETAILED DESCRIPTION

Other than the inventive concept, the elements shown in the figures are well known and will not be described in detail. Also, familiarity with television broadcasting and receivers is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Likewise, other than the inventive concept, transmission concepts such as eight-level vestigial sideband (8-VSB), Quadrature Amplitude Modulation (QAM), and receiver components such as a radio-frequency (RF) front-end, or receiver section, such as a low noise block, tuners, demodulators, correlators, leak integrators and squarers is assumed. Similarly, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

Figure 1:
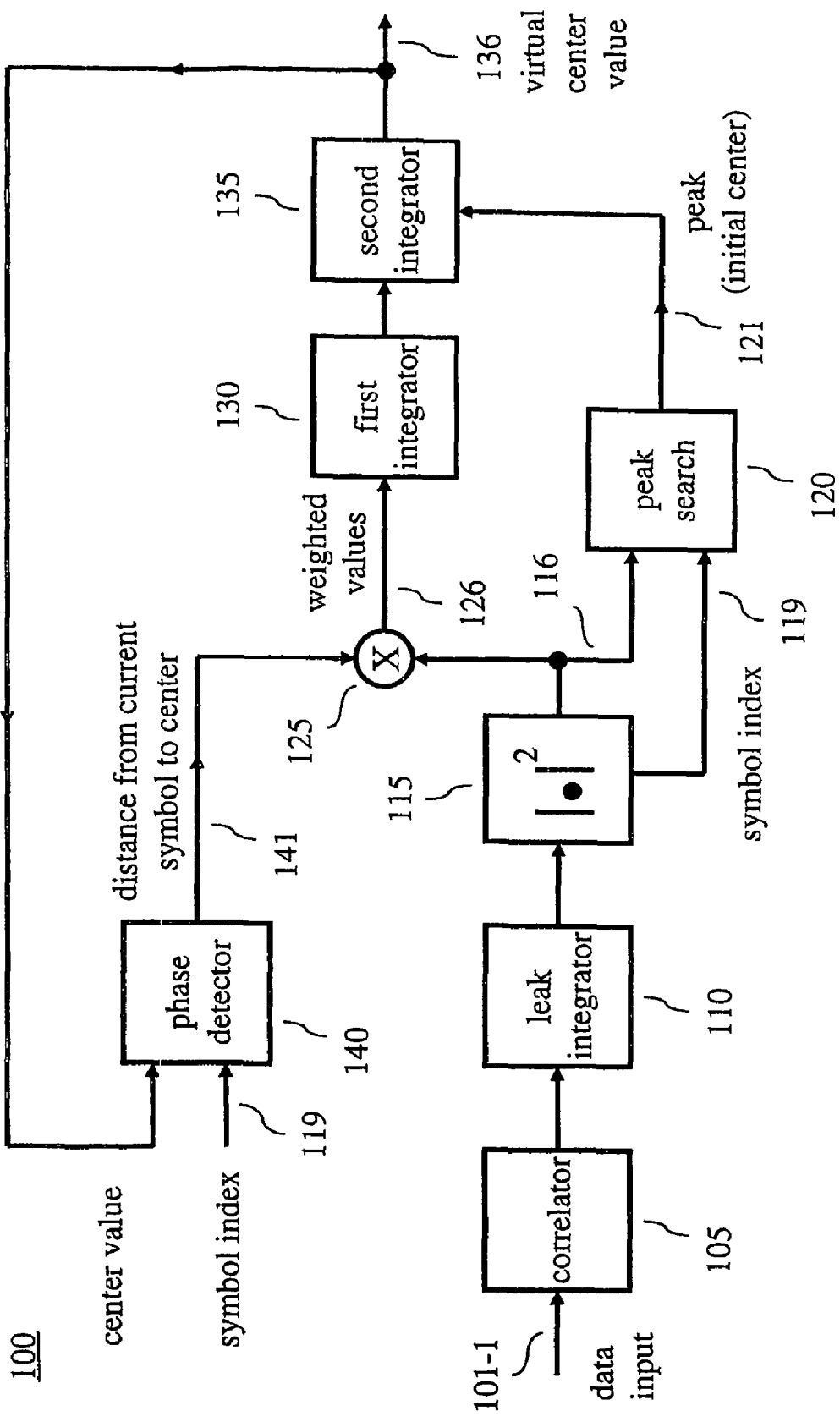
FIG. 1 shows a block diagram of a centroid calculator.

Before describing the inventive concept, a block diagram of a centroid calculator 100 is shown in FIG. 1 for use in an ATSC-DTV system. Centroid calculator 100 comprises correlator 105, leak integrator 110, squarer 115, peak search element 120, multiplier 125, first integrator 130, second integrator 135 and phase detector 140. Centroid calculator 100 is based on the segment sync signal, one sample-per-symbol and a data input signal 101-1 comprising only the in-phase (real) component. The data input signal 101-1 represents a demodulated received ATSC-DTV signal provided by a demodulator (not shown).

The data input signal 101-1 is applied to correlator 105 (or segment sync detector 105) for detection of the segment sync signal (or pattern) therein. The segment sync signal has a repetitive pattern and the distance between two adjacent segment sync signals is rather large (832 symbols). As such, the segment sync signal can be used to estimate the channel impulse response, which in turn is used to estimate the channel virtual center or centroid. Segment sync detector 105 correlates data input signal 101-1 against the characteristic of the ATSC-DTV segment sync, that is, [1 0 0 1] in binary representation, or [+5 −5 −5 +5] in VSB symbol representation. The output signal from segment sync detector 105 is then applied to leak integrator 110. The latter has a length of 832 symbols, which equals the number of symbols in one segment. Since the VSB data is random, the integrator values at data symbol positions will be averaged towards zero. However, since the four segment sync symbols repeat every 832 symbols, the integrator value at a segment sync location will grow proportionally to the signal strength. If the channel impulse response presents multipath or ghosts, the segment sync symbols will appear at those multipath delay positions. As a result, the integrator values at the multipath delay positions will also grow proportionally to the ghost amplitude. The leak integrator is such that, after a peak search is performed, it subtracts a constant value every time the integrator adds a new number. This is done to avoid hardware overflow. The 832 leak integrator values are squared by squarer 115. The resultant output signal, or correlator signal 116, is sent to peak search element 120 and multiplier 125. (It should be noted that instead of squaring, element 115 may provide the absolute value of its input signal.)

As each leak integrator value (correlator signal 116) is applied to peak search element 120, the corresponding symbol index value (symbol index 119) is also applied to peak search element 120. The symbol index 119 is a virtual index that may be originally reset at zero and is incremented by one for every new leak integrator value, repeating a pattern from 0 to 831. Peak search element 120 performs a peak search over the 832 squared integrator values (correlator signal 116) and provides peak signal 121, which corresponds to the symbol index associated with the maximum value among the 832 squared integrator values. The peak signal 121 is used as the initial center of the channel and is applied to second integrator 135 (described below).

The leak integrator values (correlator signal 116) are also weighted by the relative distance from the current symbol index to the initial center and a weighted center position is then determined by a feedback loop, or centroid calculation loop. The centroid calculation loop comprises phase detector 140, multiplier 125, first integrator 130 and second integrator 135. This feedback loop starts after the peak search is performed and second integrator 135 is initialized with the initial center or peak value. Phase detector 140 calculates the distance (signal 141) between the current symbol index (symbol index 119) and the virtual center value 136. The weighted values 126 are calculated via multiplier 125 and are fed to first integrator 130, which accumulates the weighted values for every group of 832 symbols. As noted above, second integrator 135 is initially set to the peak value and then proceeds to accumulate the output of first integrator 130 to create the virtual center value, or centroid, 136. All integrators in FIG. 1 have implicit scaling factors.

Figure 2:
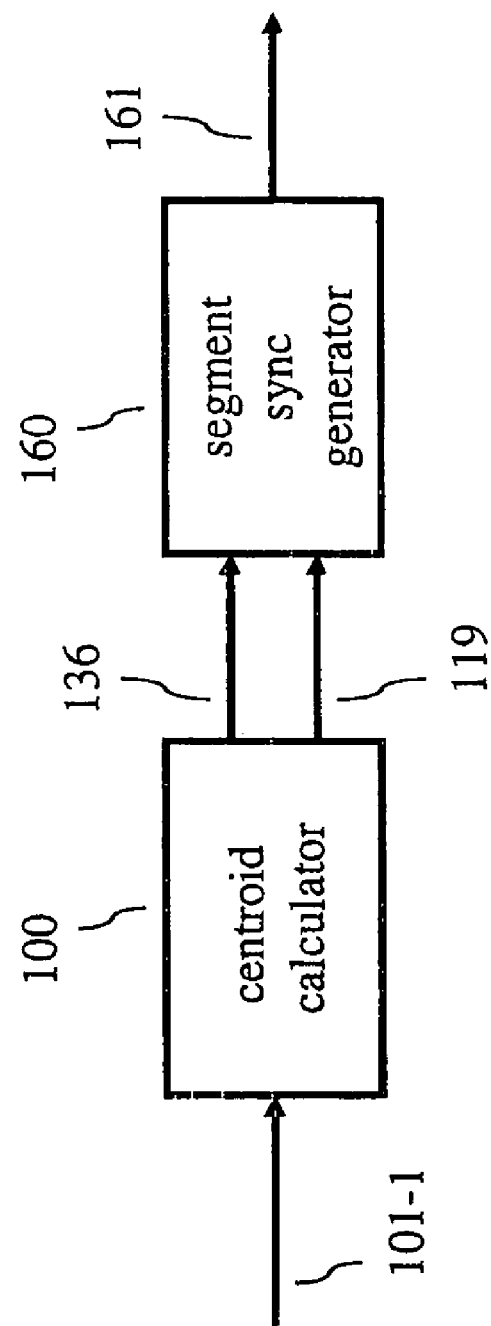
FIG. 2 shows a block diagram of a segment sync generator.

Once the virtual center value 136 is determined, the VSB reference signals, such as the segment sync and the frame sync signal, are locally re-generated in the receiver to line up at the virtual center. As a result, taps will grow in the equalizer to equalize the channel such that the equalized data output will be lined up at the virtual center. FIG. 2 shows a block diagram for segment sync regeneration based on the virtual center. In particular, segment sync generator 160 receives the above-described virtual center value 136 and the symbol index 119 from centroid calculator 100 and provides segment sync signal 161 in response thereto. For example, segment sync signal 161 has a value of "1" when symbol index 119 coincides with virtual center value 136 and has a value of "0" otherwise. Alternately, segment sync signal 161 may have a value of "1" during the four subsequent values of symbol index starting with the center value, and have a value of "0" otherwise.

Extensions of the system described above with respect to FIG. 1 to a complex data input signal (in-phase and quadrature components), two samples per symbol or to a frame sync based design are easily derived from FIG. 1.

Figure 3:
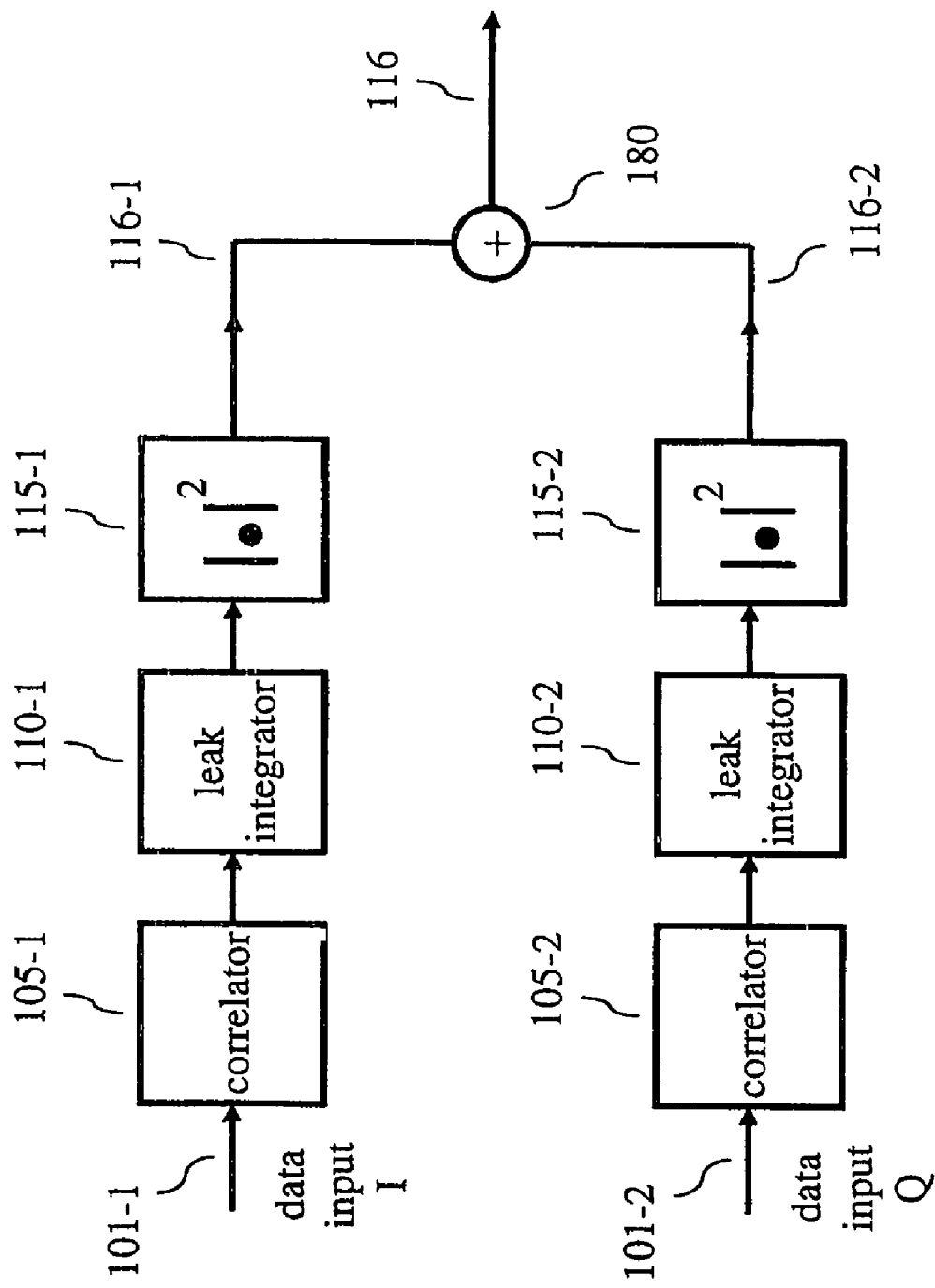
FIG. 3 shows a block diagram for processing a complex signal for use in a complex centroid calculator.

For example, if the data input signal is complex, the centroid calculator (now also referred to as a "complex centroid calculator") separately processes the in-phase (I) and quadrature (Q) components of the input data signal as shown in FIG. 3. In particular, the in-phase component (101-1) of the input data signal is processed via segment sync detector 105-1, leak integrator 110-1 and squarer 115-1; while the quadrature component (101-2) of the input data signal is processed via segment sync detector 105-2, leak integrator 110-2 and squarer 115-2. Each of these elements function in a similar fashion to those described above in FIG. 1. Although not shown in the figure, the symbol index can be generated from either squarer element. The output signals from each squarer (115-1 and 115-2) are added together via adder 180 to provide correlator signal 116 and the remainder of the processing is the same as described above with respect to FIG. 1.

In the ATSC-DTV standard, the equalizer is generally an adaptive filter which receives a VSB data stream at an average rate equal to the symbol rate of approximately 10.76 MHz and attempts to remove linear distortions mainly caused by multipath propagation, which is characteristic of the terrestrial broadcast channel. The most common equalizer design for this application consists of a T-spaced DFE (Decision Feedback Equalizer). The DFE generally includes a feedforward filter, a feedback filter and a slicer, wherein the feedback filter is generally driven by decisions from the slicer. Typically, the equalizer has a certain number of taps, K, in its filters, depending on such factors as the multipath delay spread to be equalized, where the tap spacings "T" are generally, but not always, at the symbol rate and each tap has an associated coefficient value, $C_k$ ($0 \leq k < K$). The values of these filter coefficients are adjusted to adapt to the desired characteristics to reduce the undesired distortion effects. An important parameter of such filters is the convergence rate, which may be defined as the number of iterations required for convergence to an optimum setting of the equalizer, i.e., optimum filter coefficient values. Adaptation of the filter coefficients may typically take place by transmission of a "training sequence" during a synchronization interval in the transmitted signal or it may be by a "blind algorithm" using property restoral techniques of the transmitted signal.

Figure 4:
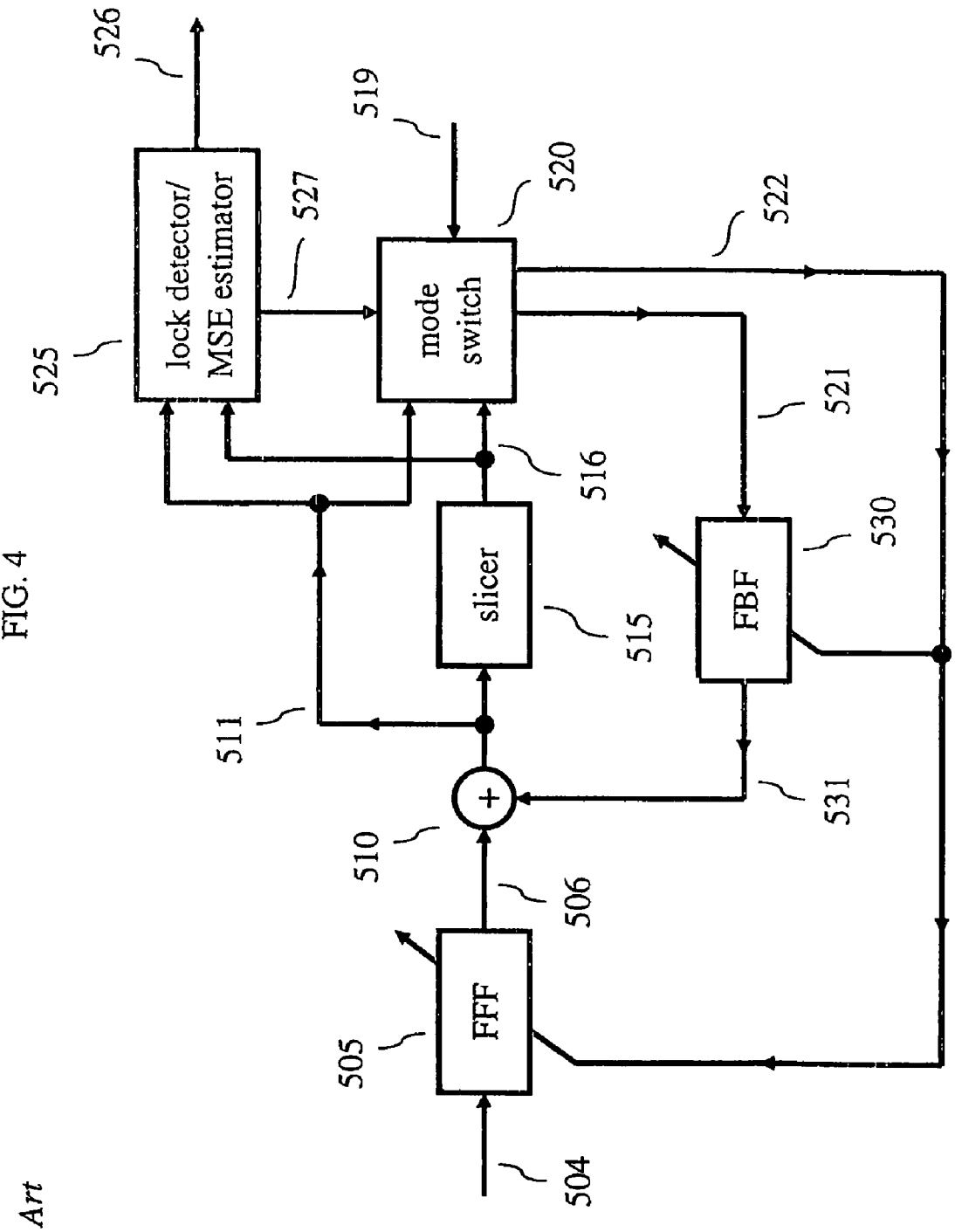
FIG. 4 shows a block diagram of an equalizer.

A prior art block diagram of a DFE equalizer 500 is shown in FIG. 4. The functions of the various elements of equalizer 500 are well known and will only be described very briefly herein. Specific algorithms for adapting equalizer coefficients, such as least-mean square (LMS), Constant Modulus Algorithm (CMA) and the Reduced Constellation Algorithm (RCA) are known in the art and not described herein. Equalizer 500 comprises feed-forward filter (FFF) 505, combiner 510, slicer 515, mode switch element 520, lock detector/mean square error (MSE) estimator 525 (hereafter simply lock detector 525) and feed-back filter (FBF) 530. Both FFF 505 and FBF 530 have adjustable filter coefficients as represented by signal path 522. The signal to be filtered, input signal 504, is applied to FFF 505, which filters the signal and provides output signal 506 to combiner 510. The other filter of equalizer 500, i.e., FBF 530, filters signal 521 (provided by mode switch element 520) to provide output signal 531 to combiner 510. As described further below, mode switch element 520 alters the source of signal 521 as a function of the mode of equalizer 500. In this description, the source of signal 521 can be equalizer output signal 511, slicer output signal 516 or external signal 519. Thus, depending on the equalizer mode, FBF 530 filters different signals. In this example, equalizer 500 has three modes of operation: a training mode, a blind mode and a decision-directed mode. Returning to combiner 510, this element adds the output signals from the two filters and provides equalizer output signal 511. The latter is further processed by slicer 515, which provides sliced output signal 516. As known in the art, slicer 515 selects symbols from the symbol constellation (not shown) that are closest to particular values of equalizer output signal 511 in each symbol interval, T, and provides the selected symbols as slicer output signal 516.

The remaining elements of equalizer 500 provide status information and also control the mode of equalizer 500. Lock detector 525 is responsible for detecting convergence of equalizer 500 and providing a measure of the MSE between equalizer output signal 511 and slicer output signal 516. With respect to convergence, lock detector 525 provides lock signal 526, which represents whether equalizer 500 is locked or not (i.e., converged or not). In particular, lock detector 525 compares equalizer output signal 511 and slicer output signal 516 against a threshold with an MSE type of measure. Lock signal 526 is provided to other portions (not shown) of the receiver for use therein. With respect to the measure of the MSE, lock detector 525 provides MSE estimate 527 to mode switch element 520.

Mode switch element 520 determines the mode (training, blind or decision-directed) of equalizer 500 as a function of MSE estimate 527. The mode of equalizer 500 determines the input signal that is applied to FBF 530, via signal 521, as well as the error and control signals to be used in adapting the equalizer, via signaling path 522. The input signal to FBF 530 may be equalizer output signal 511, slicer output signal 516 or external input signal 519. The external input signal may be, e.g., a training sequence, or a signal provided by another receiver block. Equalizer 500 uses the training and blind modes for convergence purposes only. After the lock detector 525 detects convergence, equalizer 500 then transitions to the decision-directed mode. If convergence is lost, equalizer 500 goes back to the training or blind mode.

In the training mode, a training signal or training sequence is used to adapt or update the equalizer tap coefficients. The training signal is a known reference signal. An error signal is formed in the Mode switch 520 by subtracting (not shown in FIG. 4) a locally generated copy of the training signal (received via signal 519) from equalizer output signal 511. Mode switch element 520 provides this error signal to FFF 505 and FBF 530 for the purpose of coefficient adaptation, via signal 522. With respect to an ATSC receiver, a training sequence of up to 704 symbols is included in the field sync of the ATSC-DTV signal to allow for initial equalizer convergence. In addition, another form of sync signal, the segment sync, occurs more frequently in the ATSC-DTV signal, although only including 4 symbols. In the training mode, the equalizer coefficients are updated during the field sync or also the segment sync. However, there are two main drawbacks associated with use of the field sync signal. The first is that this requires correct detection of the field sync signal in the received signal and the second is that the field sync signal only occurs approximately every 25 milliseconds (ms), possibly resulting in slow convergence.

Indeed, since ghost environments may make it difficult to detect the field sync signal, it is of interest to have an initial adjustment of the equalizer tap coefficients independent of a training sequence, i.e., to use the blind mode. Since the blind mode works on every received data symbol, the blind algorithm (e.g., the above-noted CMA or RCA algorithms) will have a faster convergence. In the CMA blind mode, for example, mode switch element 520 provides equalizer output signal 511 to FBF 530, via signal 521.

After convergence, equalizer 500 is switched to a decision-directed operating mode. In this mode, final convergence of the filter tap weights or coefficients is achieved by using the actual values of symbols (e.g., via the above-noted LMS algorithm). As such, in the decision-directed mode, mode switch element 520 either provides slicer output signal 516, equalizer output signal 511, or external signal 519 to FBF 530, via signal 521, The decision-directed mode is capable of tracking and canceling time varying channel distortions more rapidly than methods using periodically transmitted training signals. In order for decision-directed equalization to provide reliable convergence and stable coefficient values, a high percentage of the decisions must be correct.

A traditional form of equalization starts equalizer 500 with a preset non-zero value in the main tap (not shown), while all the remaining taps are set equal to values of zero. The main tap is generally a predetermined FFF tap in this case. In contrast, another form of equalization starts equalizer 500 without a main tap value and all of the taps are set equal to a value of zero. This latter form of equalization provides a potential performance advantage in digital systems like the above-mentioned ATSC-DTV system. However, we have also observed that this potential performance advantage is offset by the need to rely on a training algorithm for initial acquisition, which can negatively impact receiver performance. For example, acquisition in an ATSC receiver can be quite slow since the main training signal, i.e., the ATSC-DTV field sync signal, only repeats every 25 ms (milliseconds).

Therefore, and in accordance with the principles of the invention, a dual-mode equalizer takes advantage of both types of equalization approaches depending on received signal properties. In particular, a receiver comprises an equalizer that has at least two coefficient modes of operation, in a first coefficient mode, the equalizer starts with a preset non-zero value in at least one tap, e.g., the main tap; while in a second coefficient mode, the equalizer starts such that all taps are set equal to the same value, e.g., a value of zero.

Figure 5:
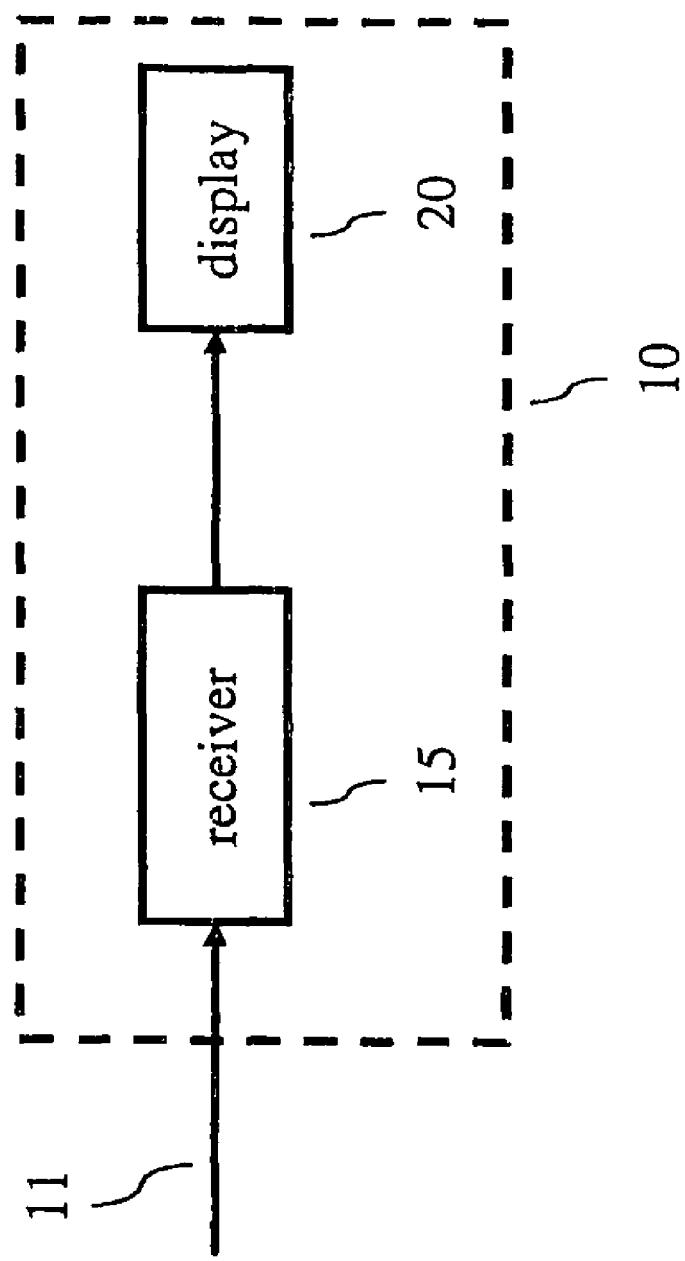
FIG. 5 shows an illustrative high-level block diagram of a receiver embodying the principles of the invention.

A high-level block diagram of an illustrative television set 10 in accordance with the principles of the invention is shown in FIG. 5. Television (TV) set 10 includes a receiver 15 and a display 20. Illustratively, receiver 15 is an ATSC-compatible receiver. It should be noted that receiver 15 may also be NTSC (National Television Systems Committee)-compatible, i.e., have an NTSC mode of operation and an ATSC mode of operation such that TV set 10 is capable of displaying video content from an NTSC broadcast or an ATSC broadcast. For simplicity in describing the inventive concept, only the ATSC mode of operation is described herein. Receiver 15 receives a broadcast signal 11 (e.g., via an antenna (not shown)) for processing to recover therefrom, e.g., an HDTV (high definition TV) video signal for application to display 20 for viewing video content thereon.

Figure 6:
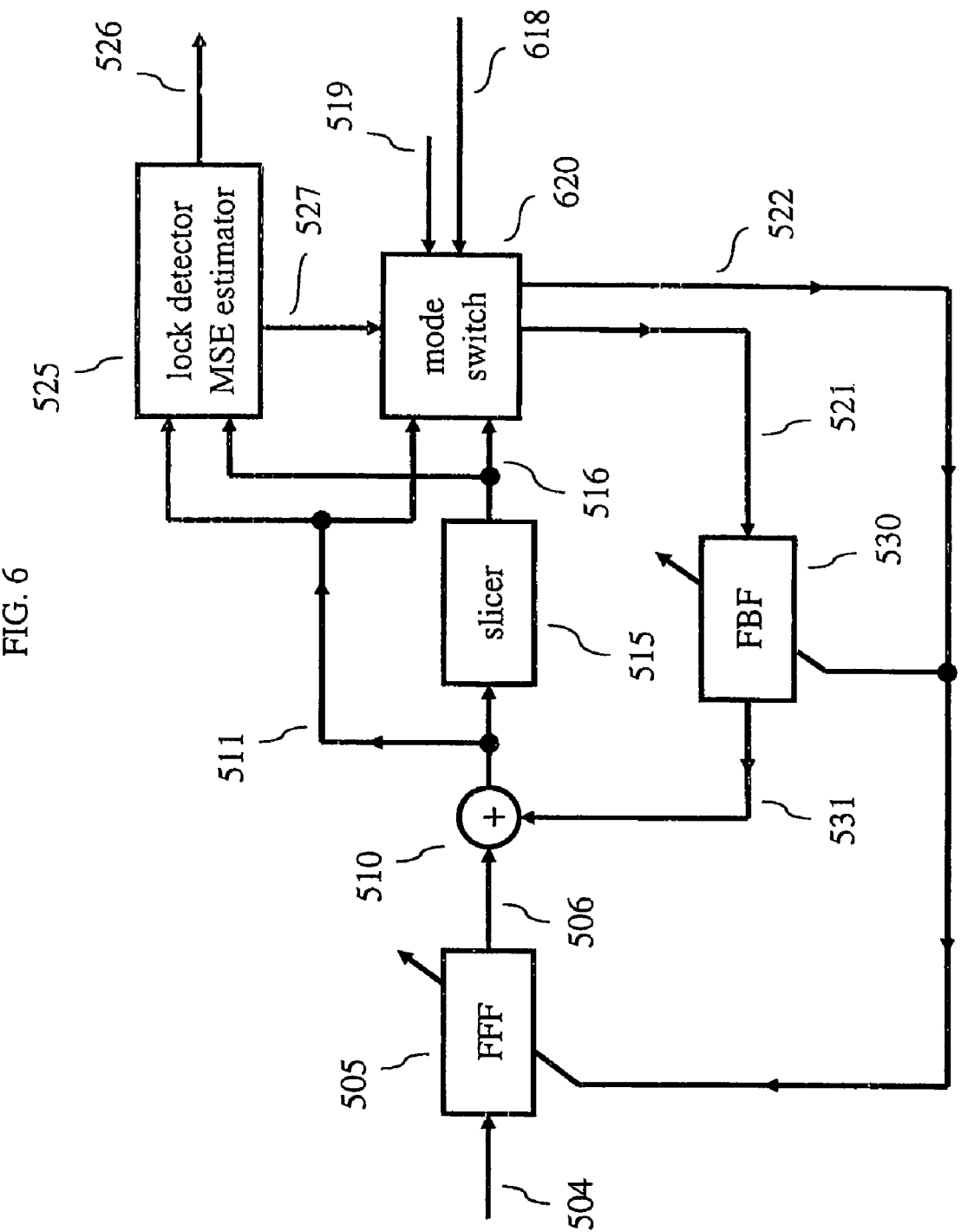
FIG. 6 shows an illustrative portion of a receiver embodying the principles of the invention.
Figure 7:
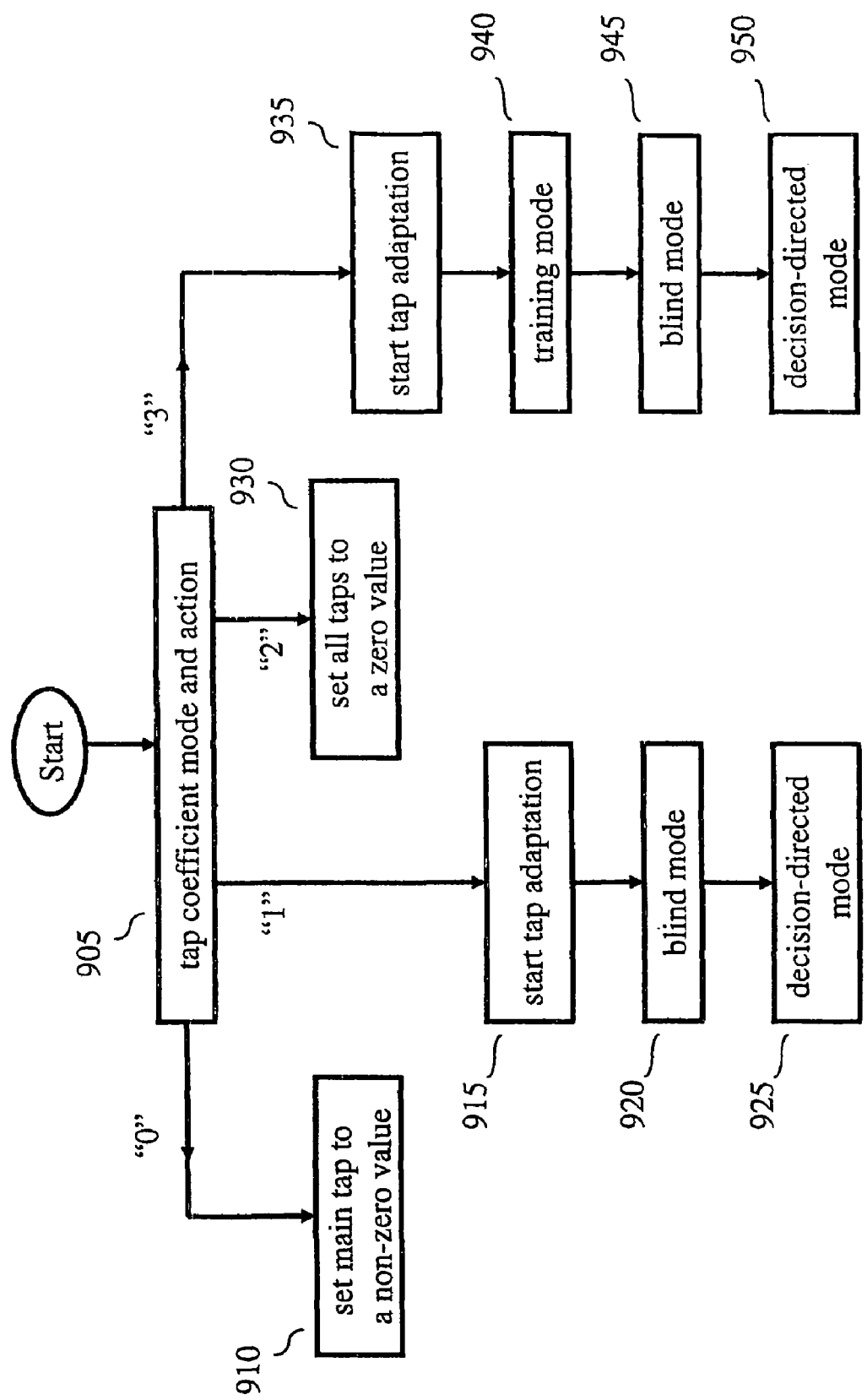
FIG. 7 shows an illustrative flow charts in accordance with the principles of the invention.

In accordance with the principles of the invention, receiver 15 includes an equalizer that has at least two coefficient modes of operation. An illustrative embodiment of an equalizer 600 in accordance with the principles of the invention is shown in FIG. 6. Equalizer 600 is similar to equalizer 500 except for mode switch element 620. The latter element is responsive to equalizer coefficient mode control signal 618 for selecting one of a number of coefficient modes of operation. Turning now to FIG. 7, an illustrative flow chart for use in mode switch element 620 is shown. In step 905, mode switch element 620 determines the coefficient mode of operation and set of actions by examining equalizer coefficient mode control signal 618. In this example, there are two coefficient modes of operation, each with two distinct sets of actions: initialization and tap adaptation. In this case, the grouping of the mode of operation and the set of actions constitutes four possibilities for the equalizer coefficient mode control. Illustratively, the first coefficient mode of operation is associated with equalizer coefficient mode control signal 618 values of "0" and "1"; while the second coefficient mode of operation is associated with equalizer coefficient mode control signal 618 values of "2" and "3". However, the inventive concept is not so limited. In step 905, if the value of equalizer coefficient mode control signal 618 is representative of a "0", then mode switch element 620 sets equalizer 600 to the first coefficient mode of operation and the action is initialization. Hence, in step 910, the mode switch element 620 sets at least one tap of equalizer 600, e.g., the main tap, to a non-zero value. However, if the value of equalizer coefficient mode control signal 618 is representative of a "1", then mode switch element 620 sets equalizer 600 to the first coefficient mode of operation and the action is adaptation. Hence, in step 915, mode switch element 620 starts equalizer 600 tap adaptation. In addition, equalizer 600 enters a blind mode of operation (described earlier) in step 920 and, upon convergence, transitions to a decision-directed mode of operation (described earlier) in step 925. It should be noted that other alternatives are possible. For example, step 920 can be a combined blind/training mode of operation and step 925 can be a combined training/decision-directed mode of operation. A combined blind/training mode of operation is one for which a blind mode is applied during the data portion of the stream and a training mode is applied during the training or sync portion of the stream. A combined training/decision-directed mode of operation is one for which a decision-directed mode is applied during the data portion of the stream and a training mode is applied during the training or sync portion of the stream. The transition between modes represented by steps 920 and 925 is based on achieving equalizer convergence as a function of the MSE at the equalizer output, according to a programmable threshold value, mse_thresh. For example, if the value of MSE estimate $527 \leq$ mse_thresh, then equalizer 600 has converged, the lock signal 526 is set equal to a value of "1" and equalizer 600 transitions from step 920 to step 925.

Continuing with the description of the flow chart of FIG. 7, if the value of equalizer coefficient mode control signal 618 is representative of a "2", then mode switch element 620 sets equalizer 600 to the second coefficient mode of operation and the action is initialization. Hence, in step 930, the mode switch element 620 sets all of the taps of equalizer 600 to the same value, e.g., a value of zero. However, if the value of equalizer coefficient mode control signal 618 is representative of a "3", then mode switch element 620 sets equalizer 600 to the second coefficient mode of operation and the action is adaptation. Hence, in step 935, mode switch element 620 starts equalizer 600 tap adaptation. In addition, equalizer 600 enters a training mode of operation (described earlier) in step 940 and, upon achieving different levels of convergence, first transitions to a blind mode of operation (described earlier) in step 945 and then transitions to a decision-directed mode of operation (described earlier) in step 950. The two distinct transitions between steps 940/945 and steps 945/950 are a function of the MSE at the equalizer output, according to two programmable threshold values, mse_thresh1 and mse_thresh2, where mse_thresh1>mse_thresh2. For example, if the estimated mse_thresh2<MSE estimate $527 \leq$ mse_thresh1, then equalizer 600 transitions from step 940 to step 945. Once in step 945, if MSE estimate 527<mse_thresh2, then equalizer 600 has converged, the lock signal 526 is set equal to a value of "1" and equalizer 600 transitions from step 945 to step 950. As noted above, other alternatives are also possible for steps 940, 945 and/or 950 in the context of a combined blind/training mode of operation, combined training/decision-directed mode, etc.

As noted above, the equalizer coefficient mode of operation and set of actions are determined by equalizer coefficient control signal 618. Receiver 15 of FIG. 5 can provide this signal in anyone of a number of ways. For example, equalizer coefficient control signal 618 may be provided via a programmable register controlled by a processor (not shown) of receiver 15, or be provided from another receiver block. For example, the processor can select one of a number of coefficient modes as a function of the received signal as represented by lock signal 526 and/or MSE estimate 527.

Figure 8:
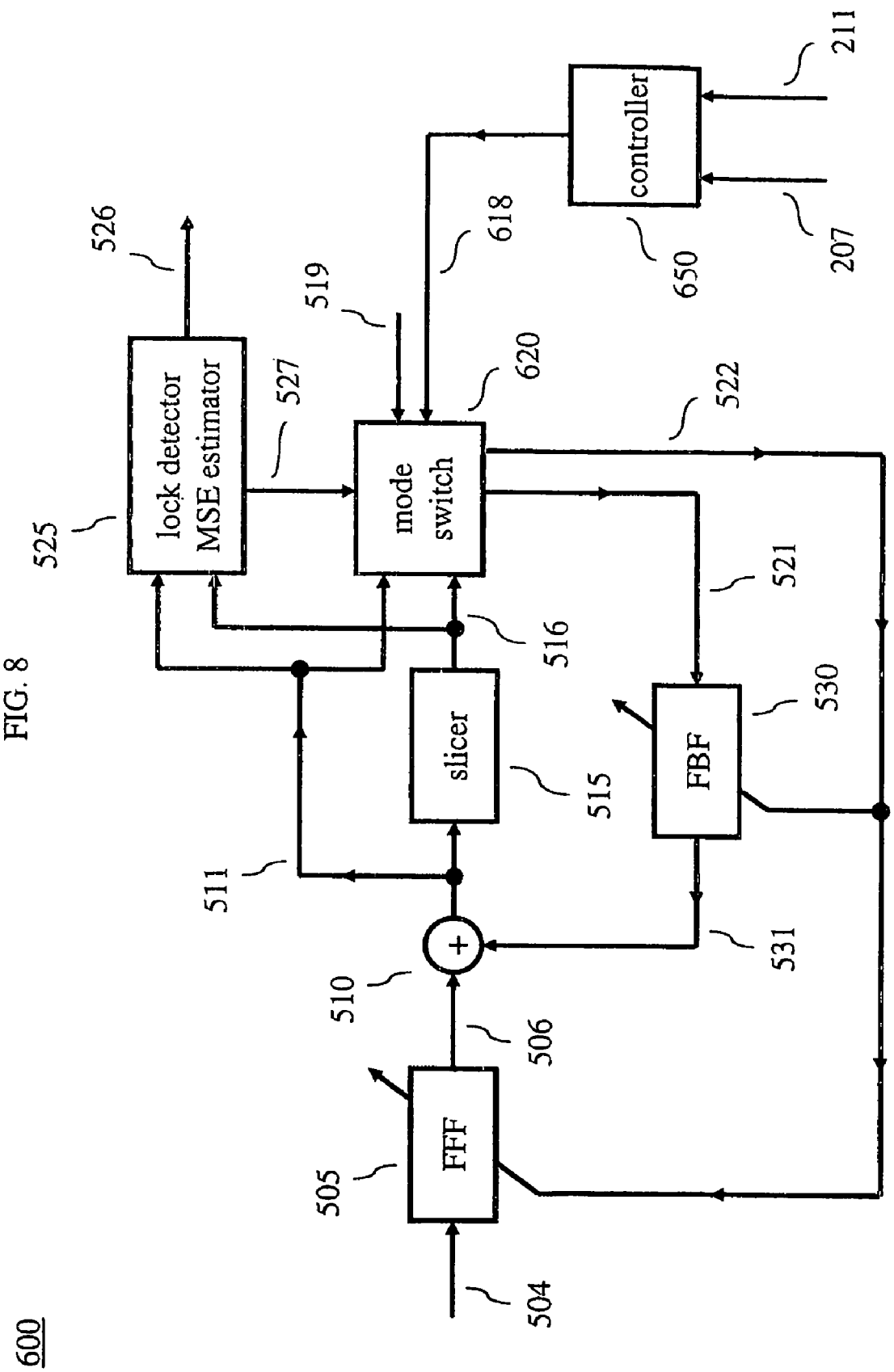
FIG. 8 shows another embodiment in accordance with the principles of the invention.

Referring now to FIG. 8, another illustrative embodiment of an equalizer 600 in accordance with the principles of the invention is shown. In this embodiment, equalizer coefficient mode control signal 618 is provided by another receiver block as represented by controller 650. The remaining elements of FIG. 8 are similar to those shown in FIG. 6. Also, in this embodiment a particular coefficient mode of operation is represented by the flow chart of FIG. 7. Controller 650 determines the equalizer coefficient mode of operation and set of actions as a function of mode signal 207 and status signal 211. Mode signal 207 is set by a processor (not shown) of receiver 15 and is associated with a mode of a dual-mode sync generator (described further below). In this regard, status signal 211 represents a status signal from the dual-mode sync generator. The use of information from a dual-mode sync generator can speed up receiver response and thus be beneficial to the overall timing of receiver 15, particularly when the dual-mode sync generator is in mode 2. As described further below, in mode 2, the segment sync generation is based on the centroid calculator peak value initially, and only transitions to being based on the centroid calculator center value when the center value calculation has subsequently completed.

In this illustrative embodiment, controller 650 provides equalizer coefficient mode control signal 618 in accordance with Table One, which is shown in FIG. 9. For example, if the value of mode signal 207 is "0" and the value of status signal 211 is "0" then controller 650 sets equalizer coefficient mode control signal 618 to a value of "0"—thus setting equalizer 600 to the first coefficient mode of operation. It can be observed that in the last row of Table One, the entry of "(2, 3)" means a value of "2," followed by a value of "3". This represents that equalizer 600 is first set to the second coefficient mode of operation to be initialized and is subsequently set to perform tap adaptation in the same coefficient mode of operation. It should be observed that in this embodiment, precedence is given to the first coefficient mode of operation when the dual-mode sync generator is in mode 2.

Alternative embodiments for controller 650 are also possible. For example, consider Table Two of FIG. 10. In this embodiment, controller 650 gives precedence to the second coefficient mode of operation when the dual-mode sync generator is in mode 2.

In both variations illustrated by Table One of FIG. 9 and Table Two of FIG. 10, equalizer 600 is started as soon as the peak value is calculated. As a result, there may be substantial savings in equalizer convergence time and overall receiver acquisition time for many cases of practical channels where the peak and center value do not differ by much.

The remainder of the detailed description describes various illustrative embodiments of a dual-mode sync generator for use in the embodiments of FIGS. 8, 9 and 10, described above.

Illustratively, receiver 15 of FIG. 5 comprises a sync generator for providing a synchronization signal, wherein the sync generator comprises at least two modes of operation, wherein in a first mode of operation the sync generator generates the synchronization signal as a function of a channel virtual center signal and in a second mode of operation the dual-mode sync generator generates the synchronization signal as a function of a correlation signal.

In accordance with the principles of the invention, the dual-mode sync generator may be used in conjunction with an equalizer to speed up receiver response. The idea is based on the fact that for many channel impulse responses, the corresponding virtual center position is relatively close to the main signal position, that is, the signal with maximum strength or peak. Since the virtual center calculation can only be performed after demodulator convergence and the equalizer is only started after the channel center value is identified, this may increase receiver acquisition time. In view of this, a dual-mode sync generator enables the receiver to start the equalizer as soon as the peak search is performed but before determination of the channel virtual center by using a correlation signal signifying detection of the synchronization signal. This assumes that the virtual center is the main signal or peak. Once the virtual center calculation is completed, a decision can then be made whether to restart the equalizer with the new virtual center, or to proceed the processing with the original peak. This decision may be based, for example, on whether the peak and the center value positions are within a threshold distance, or whether the equalizer has already converged. For many channel impulse responses this early start on equalization will represent savings on convergence time and overall receiver acquisition time. Even if a decision is made to use the virtual center once it is available, the equalizer can be reset without any penalty compared to the original strategy of waiting for the center value calculation.

Figure 11:
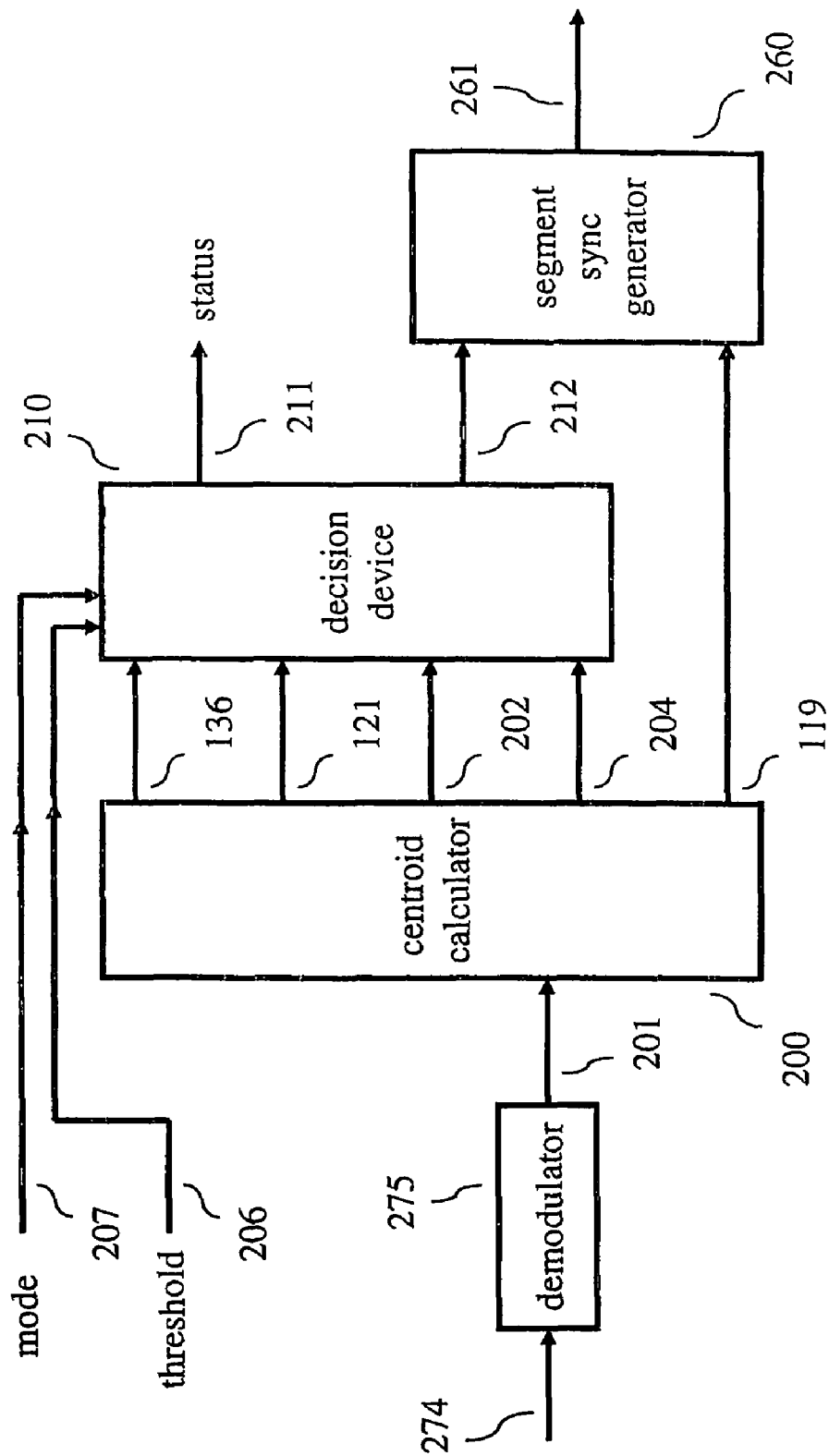
FIG. 11 shows an illustrative embodiment of a dual-mode sync generator for use in receiver 15 of FIG. 5.

In view of the above, receiver 15 includes a dual-mode sync generator that has at least two modes of operation, wherein in a first mode of operation the dual-mode sync generator generates the segment sync signal as a function of a virtual center signal and in a second mode of operation the dual-mode sync generator generates the segment sync signal as a function of a correlation signal. An illustrative block diagram of the relevant portion of receiver 15 is shown in FIG. 11. (It should be noted that other processing blocks of receiver 15 not relevant to the inventive concept are not shown herein, e.g., an RF front end for providing signal 274, etc.) A demodulator 275 receives a signal 274 that is centered at an IF frequency ($F_{IF}$) and has a bandwidth equal to 6 MHz (millions of hertz). Demodulator 275 provides a demodulated received ATSC-DTV signal 201 to centroid calculator 200. The latter is similar to centroid calculator 100 of FIG. 1 and provides a virtual center value 136, a symbol index 119 and a peak signal 121. It should be noted that peak signal 121 is representative of a signal conveying correlation data, i.e., a correlation signal. However, other signals can be used, e.g., signal 116 of FIG. 1, etc. In addition to the above-mentioned signals, centroid calculator 200 also provides a number of additional signals. First, centroid calculator 200 provides a calculation flag signal 202, which identifies when the centroid calculation is complete. For example, calculation flag signal 202 may be set to a value of "1" once: the calculation is complete and set to a value of "0" beforehand. Finally, centroid calculator 200 provides peak flag signal 204, which identifies when the peak search is complete. For example, peak flag signal 204 may be set to a value of "1" once the peak search calculation is done and set to a value of "0" beforehand.

Centroid calculator 200 provides the above-mentioned output signals 136, 121, 202 and 204 to decision device 210 (described below). In accordance with the principles of the invention, decision device 210 generates a segment reference signal 212 to segment sync generator 260, which is similar to the earlier described segment sync generator 160 of FIG. 2. In particular, segment sync generator 260 receives segment reference signal 212 from decision device 210 and the symbol index 119 from centroid calculator 200 and provides segment sync signal 261 in response thereto. For example, segment sync signal 261 has a value of "1" when symbol index 119 coincides with segment reference signal 212 and has a value of "0" otherwise. In accordance with the principles of the invention, segment sync signal 261 is generated either as a function of the virtual center value 136 or the peak signal 121.

Turning back to decision device 210, this device receives virtual center value 136, peak signal 121, calculation flag signal 202 and peak flag signal 204 from centroid calculator 200. In addition, decision device 210 also receives two control signals, a threshold signal 206 and a mode signal 207 (e.g., from a processor (not shown) of receiver 15). Illustratively, there are three modes of operation, but the inventive concept is not so limited. In a first mode of operation, e.g., mode signal 207 is set equal to a value of "0", only a correlation signal is used for generating the segment sync signal. In a second mode of operation, e.g., mode signal 207 is set equal to a value of "1", only a virtual center value is used for generating the segment sync signal. Finally, in the third mode of operation, e.g., mode signal 207 is set equal to a value of "2", either the correlation signal or the virtual center value is used for generating the segment sync signal. Finally, decision device 210 provides the above-noted segment reference signal 212 and also provides a status signal 211 for use by other portions (not shown) of receiver 15.

Figure 12:
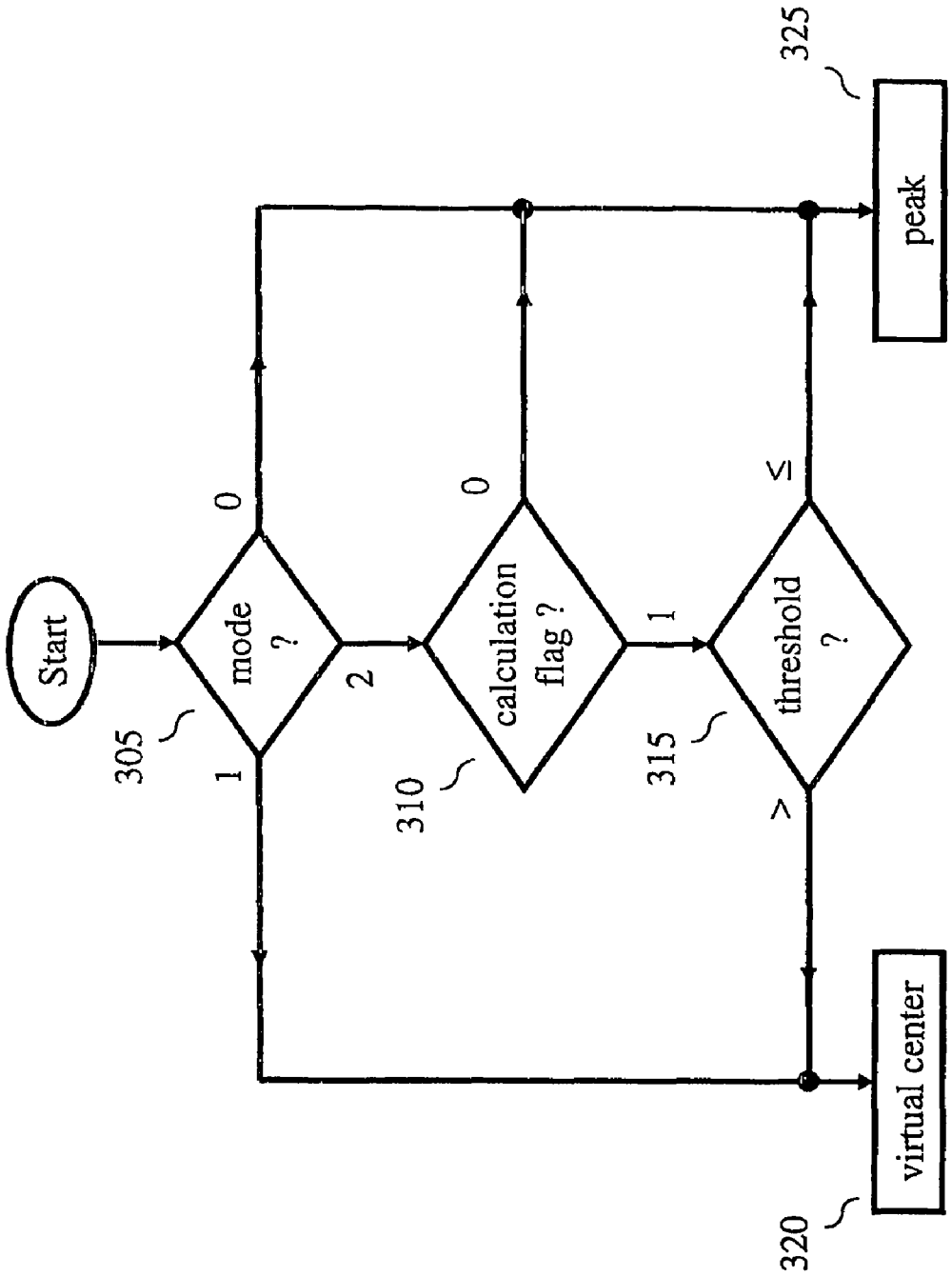
FIGS. 12 and 13 show illustrative flow charts for use in the dual-mode sync generator of FIG. 11.

In accordance with the principles of the invention, decision device 210 provides segment reference signal 212 as illustrated in the flow chart of FIG. 12. It should be noted that although the principles of the invention are described herein in the context of flow charts, other representations could also be used, e.g., state diagrams. In step 305, decision device 210 determines the current mode of operation from mode signal 207. If mode signal 207 is representative of a value of "0", then decision device 210 provides peak signal 121 as segment reference signal 212 in step 325. On the other hand, if mode signal 207 is representative of a value of "1", then decision device 210 provides virtual center value 136 as segment reference signal 212 in step 320. Finally, if mode signal 207 is representative of a value of "2", then decision device 210 evaluates the calculation flag signal 202 in step 310. If the value of calculation flag signal 202 is equal to "0", e.g., centroid calculator 200 has not yet finished determining the virtual center value, then decision device 210 provides peak signal 121 as segment reference signal 212 in step 325. However, once the value of calculation flag signal 202 becomes equal to "1", then decision device 210 evaluates the distance between the correlation value and the determined virtual center value in step 315. If the |peak−center value|≦threshold (conveyed via threshold signal 206), then decision device 210 provides peak signal 121 as segment reference signal 212 in step 325. In this case, the peak is within the threshold distance from the virtual center value. However if the |peak−center value|>threshold, then decision device 210 provides virtual center value 136 as segment reference signal 212 in step 320. In this case, the peak is greater than the threshold distance from the virtual center value.

As noted above, decision device 210 also provides status signal 211. This signal identifies to other portions of receiver 15, e.g., equalizer 600 of FIG. 8, whether the segment reference is derived from the peak or the virtual center value and may be used to reset subsequent receiver blocks like equalizer 600 of FIG. 8.

Figure 13:
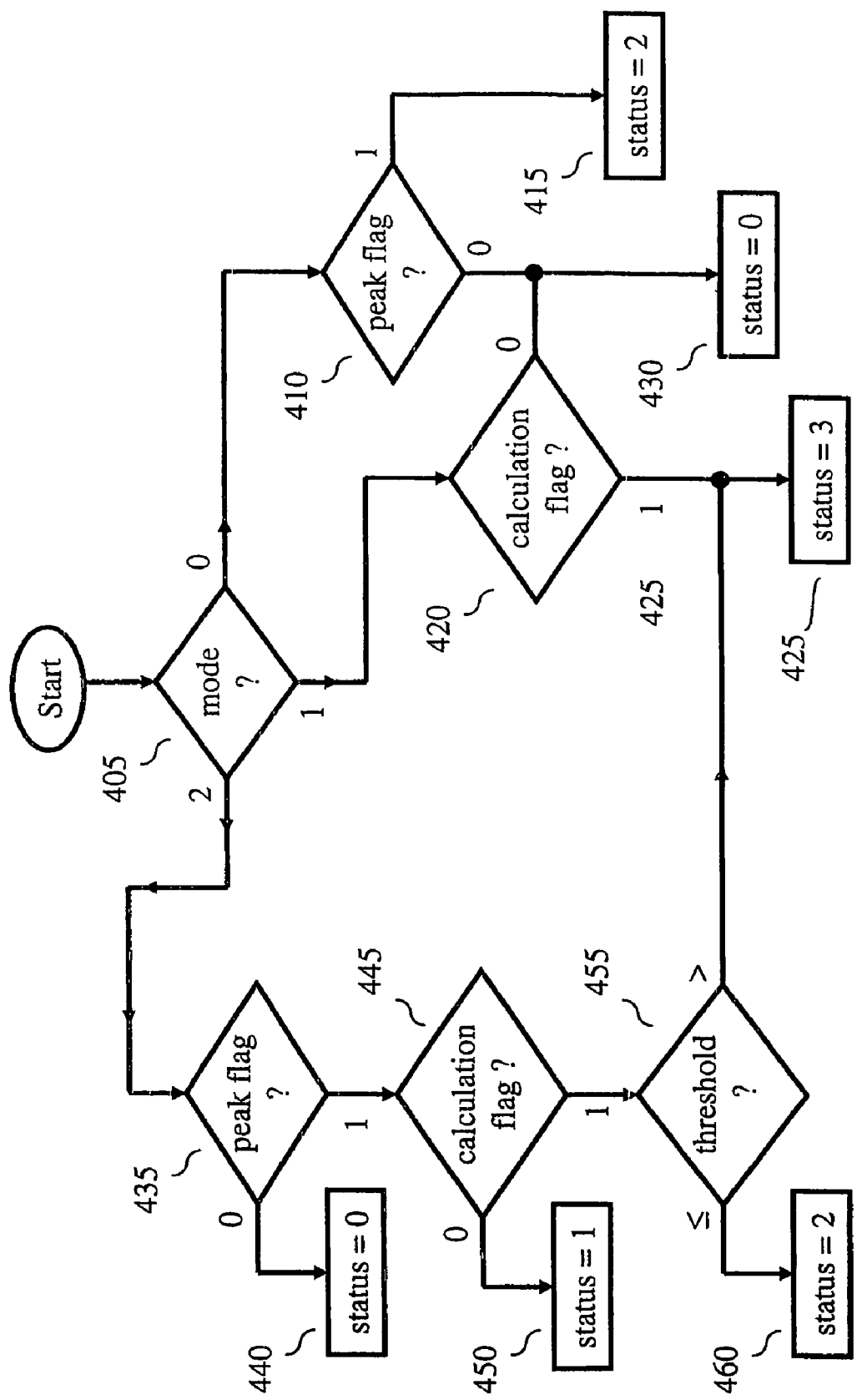

In accordance with the principles of the invention, decision device 210 provides status signal 211 as illustrated in the flow chart of FIG. 13. Like the flow chart shown in FIG. 12, decision device 210 first determines the mode of operation in step 405. If mode signal 207 is representative of a value of "0", (peak signal 121 is being used to generate segment reference signal 212) then decision device 210 evaluates peak flag signal 204 in step 410. If the value of peak flag signal 204 is equal to a "1", i.e., the peak search is complete, then decision device 210 sets status signal 211 to a value of "2" in step 415. However, if the value of peak flag signal 204 is equal to a "0", i.e., the peak search is not complete, then decision device 210 sets status signal 211 to a value of "0" in step 430. On the other hand, if mode signal 207 is representative of a value of "1", (virtual center value 136 is being used to generate segment reference signal 212) then decision device 210 evaluates calculation flag signal 202 in step 420. If the value of calculation flag signal 202 is equal to a "1", i.e., the calculation is complete, then decision device 210 sets status signal 211 to a value of "3" in step 425. However, if the value of calculation flag signal 202 is equal to a "0", i.e., the calculation is not complete, then decision device 210 sets status signal 211 to a value of "0" in step 430. Finally, if mode signal 207 is representative of a value of "2", (either peak signal 121 or virtual center value 136 is used for generating the segment sync signal) then decision device 210 evaluates peak flag signal 204 in step 435. If the value of peak flag signal 204 is equal to a "0", i.e., the peak search is not complete, then decision device 210 sets status signal 211 to a value of "0" in step 440. However, if the value of peak flag signal 204 is equal to a "1", i.e., the peak search is complete, then decision device 210 evaluates calculation flag 202 in step 445. If the value of calculation flag signal 202 is equal to a "0", i.e., the calculation is not complete, then decision device 210 sets status signal 211 to a value of "1" in step 450. However, if the value of calculation flag signal 202 is equal to a "1", i.e., the calculation is complete, then decision device 210 evaluates the distance between the peak value and the determined virtual center value in step 455. If the |peak−center value|≦threshold (conveyed via threshold signal 206), then decision device 210 sets status signal 211 to a value of "2" in step 460. However if the |peak−center value|>threshold, then decision device 210 sets status signal 211 to a value of "3" in step 425.

Figure 14:
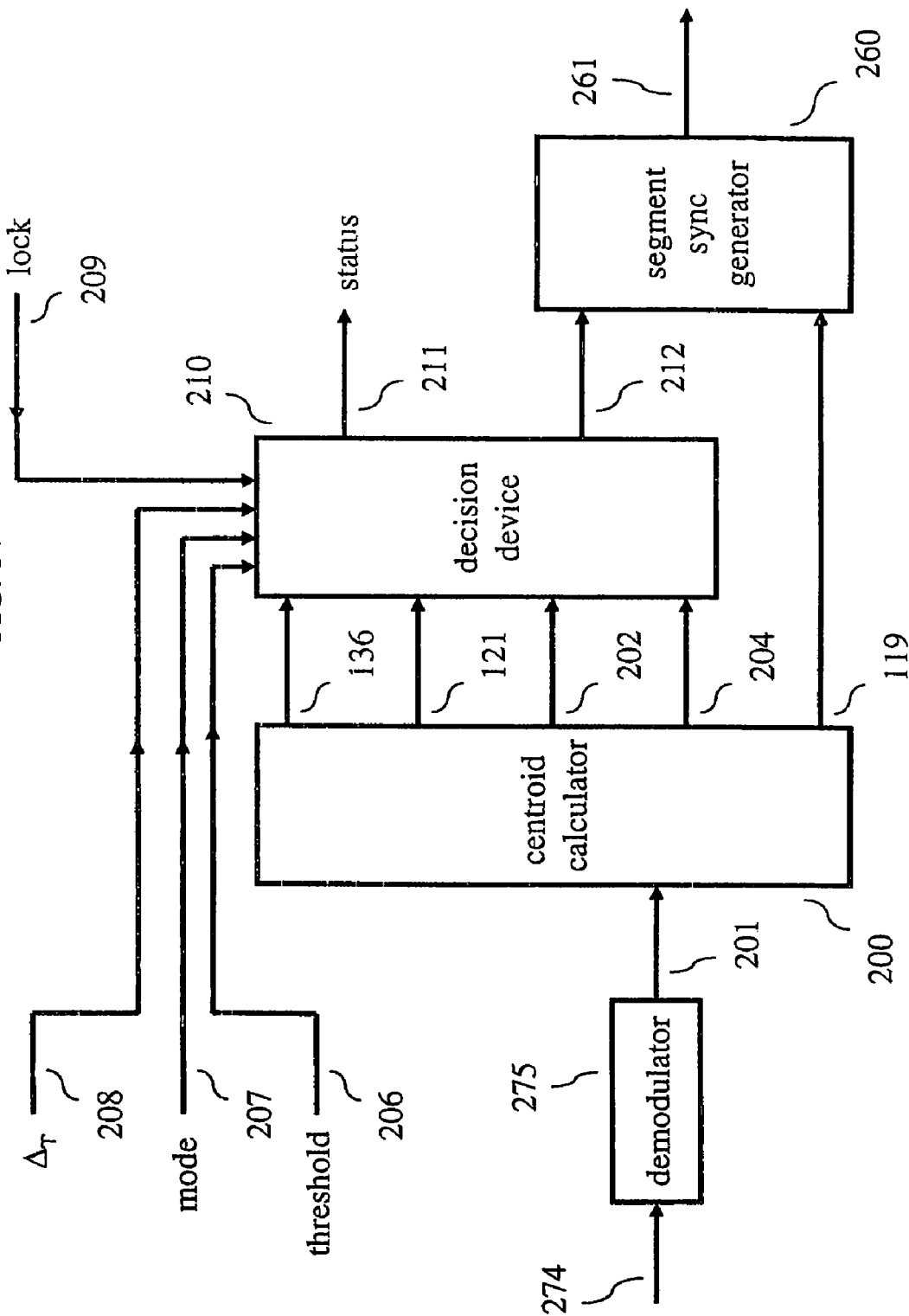
FIG. 14 shows another illustrative embodiment of a dual-mode sync generator for use in receiver 15 of FIG. 5.

Turning now to FIG. 14, another illustrative embodiment in accordance with the principles of the invention is shown. The embodiment shown in FIG. 14 is similar to that shown in FIG. 11 except that decision device 210 accepts two additional input signals. The first input signal is lock signal 209, which conveys status of, e.g., an equalizer of receiver 15, and whether the equalizer is locked or not. Lock signal 209 may come from the equalizer, another receiver block or it may be a programmable bit register controlled by a processor (all not shown in FIG. 14). The other input signal is $\Delta_T$ 208, the value of which is representative of the occurrence, or passing, of a period of time (described below). Illustratively, $\Delta_T$ 208 is provided from a programmable register controlled by a processor (not shown) of receiver 15 and is representative of a time interval, $\Delta_T \geq 0$.

Figure 15:
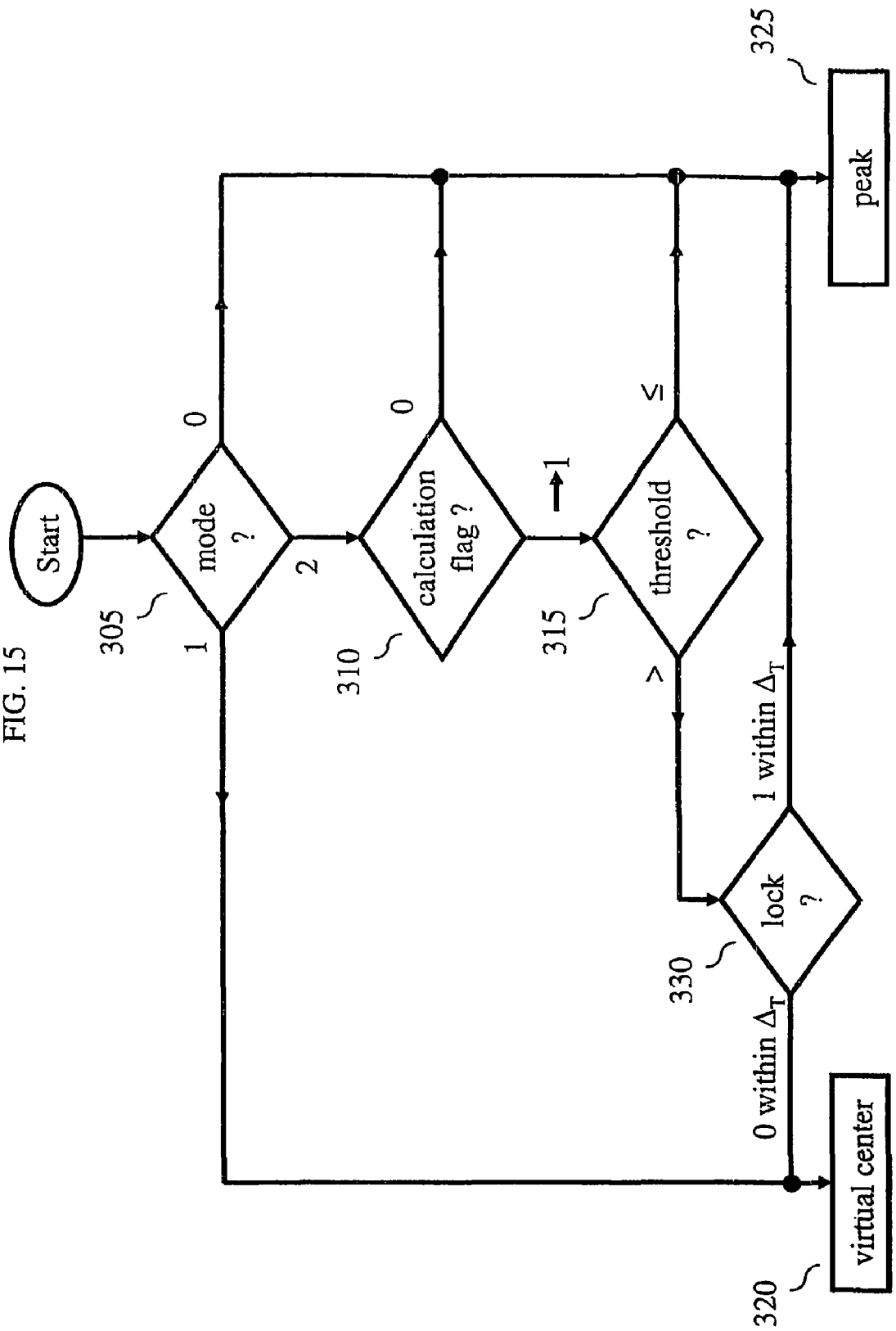
FIGS. 15 and 16 show illustrative flow charts for use in the dual-mode sync generator of FIG. 14.

In this embodiment, decision device 210 provides segment reference signal 212 as illustrated in the flow chart of FIG. 15. This flow chart is similar to the flow chart shown in FIG. 12. In step 305 of FIG. 15, decision device 210 determines the current mode of operation from mode signal 207. If mode signal 207 is representative of a value of "0", then decision device 210 provides peak signal 121 as segment reference signal 212 in step 325. On the other hand, if mode signal 207 is representative of a value of "1", then decision device 210 provides virtual center value 136 as segment reference signal 212 in step 320. Finally, if mode signal 207 is representative of a value of "2", then decision device 210 evaluates the calculation flag signal 202 in step 310. If the value of calculation flag signal 202 is equal to "0", e.g., centroid calculator 200 has not yet finished determining the virtual center value, then decision device 210 provides peak signal 121 as segment reference signal 212 in step 325. However, once the value of calculation flag signal 202 transitions to "1", (a transition to "1" is represented by the symbol "→1" in FIG. 15), i.e., the calculation is now complete, then decision device 210 evaluates the distance between the correlation value and the determined virtual center value in step 315. If the |peak−center value|≦threshold (conveyed via threshold signal 206), then decision device 210 provides peak signal 121 as segment reference signal 212 in step 325. In this case, the peak is within the threshold distance from the virtual center value. However if the |peak−center value|>threshold, then decision device 210 evaluates lock signal 209 in step 330. If the value of lock signal 209 is equal to a "1" and occurs within the $\Delta_T$ 208 time period (e.g., the equalizer has locked within this time period, which may start being computed as the calculation flag signal 202 transitions to "1") then decision device 210 provides peak signal 121 as segment reference signal 212 in step 325. However, if the value of lock signal 209 is equal to a "0" and occurs within the $\Delta_T$ 208 time period (the equalizer has not yet locked within the time period) then decision device 210 provides virtual center value 136 as segment reference signal 212 in step 320.

Figure 16:
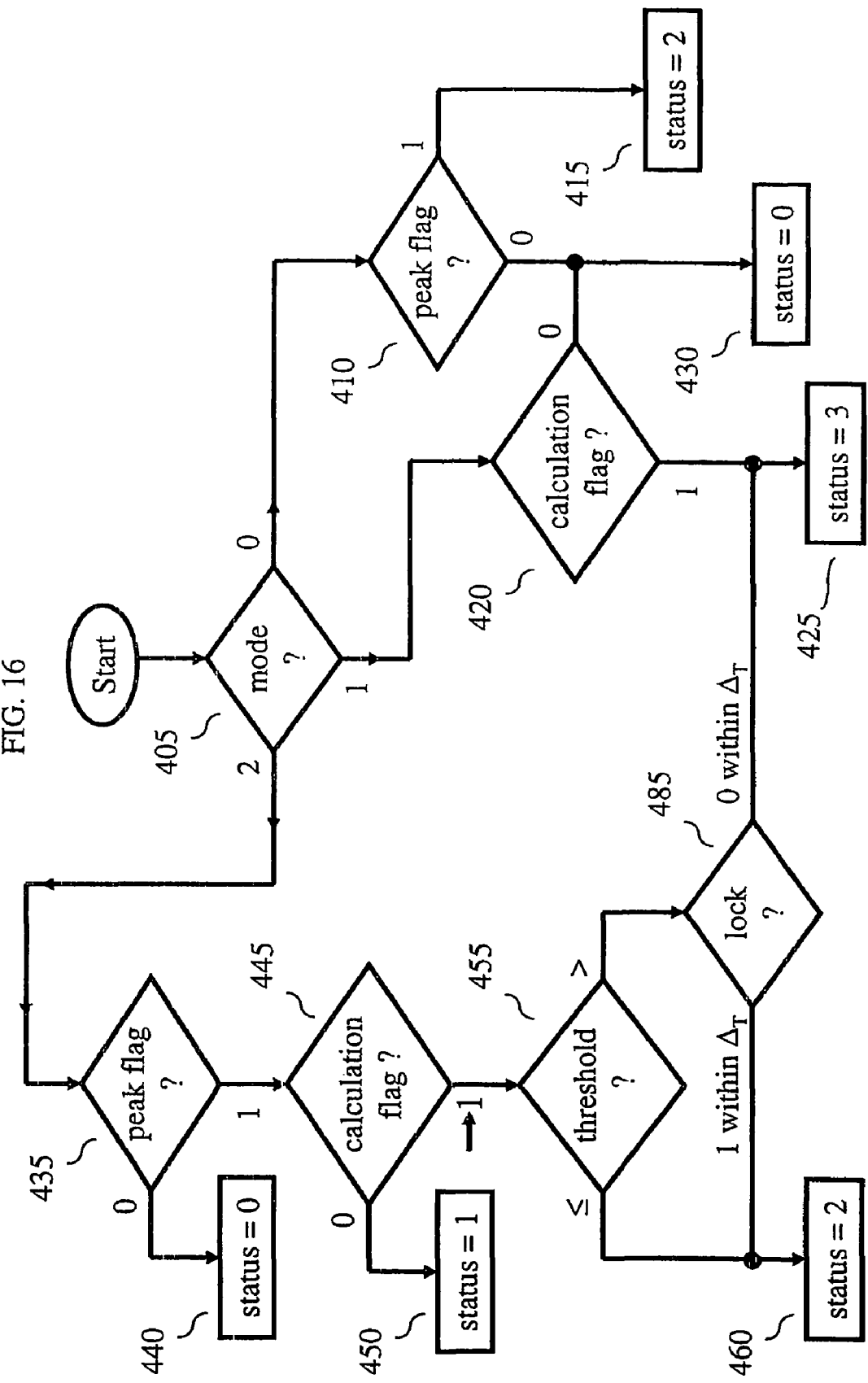

Referring now to FIG. 16, decision device 210 provides status signal 211 as illustrated in the flow chart shown therein. This flow chart, is similar to the flow chart shown in FIG. 13. Decision device 210 first determines the mode of operation in step 405. If mode signal 207 is representative of a value of "0", (peak signal 121 is being used to generate segment reference signal 212) then decision device 210 evaluates peak flag signal 204 in step 410. If the value of peak flag signal 204 is equal to a "1", i.e., the peak search is complete, then decision device 210 sets status signal 211 to a value of "2" in step 415. However, if the value of peak flag signal 204 is equal to a "0", i.e., the peak search is not complete, then decision device 210 sets status signal 211 to a value of "0" in step 430. On the other hand, if mode signal 207 is representative of a value of "1", (virtual center value 136 is being used to generate segment reference signal 212) then decision device 210 evaluates calculation flag signal 202 in step 420. If the value of calculation flag signal 202 is equal to a "1", i.e., the calculation is complete, then decision device 210 sets status signal 211 to a value of "3" in step 425. However, if the value of calculation flag signal 202 is equal to a "0", i.e., the calculation is not complete, then decision device 210 sets status signal 211 to a value of "0" in step 430. Finally, if mode signal 207 is representative of a value of "2", (either peak signal 121 or virtual center value 136 is used for generating the segment sync signal) then decision device 210 evaluates peak flag signal 204 in step 435. If the value of peak flag signal 204 is equal to a "0", i.e., the peak search is not complete, then decision device 210 sets status signal 211 to a value of "0" in step 440. However, if the value of peak flag signal 204 is equal to a "1", i.e., the peak search is complete, then decision device 210 evaluates calculation flag 202 in step 445. If the value of calculation flag signal 202 is equal to a "0", i.e., the calculation is not complete, then decision device 210 sets status signal 211 to a value of "1" in step 450. However, once the value of calculation flag signal 202 transitions to "1", (a transition to "1" is represented by the symbol "→1" in FIG. 16), i.e., the calculation is now complete, then decision device 210 evaluates the distance between the peak value and the determined virtual center value in step 455. If the |peak−center value|≦threshold (conveyed via threshold signal 206), then decision device 210 sets status signal 211 to a value of "2" in step 460. However if the |peak−center value|>threshold, then decision device 210 evaluates lock signal 209 in step 485. If the value of lock signal 209 is equal to a "1" and occurs within the $\Delta_T$ 208 time period (e.g., the equalizer has locked within this time period, which may start being computed as the calculation flag signal 202 transitions to "1") then decision device 210 sets status signal 211 to a value of "2" in step 460. However, if the value of lock signal 209 is equal to a "0" and occurs within the $\Delta_T$ 208 time period (the equalizer has not yet locked within the time period) then decision device 210 sets status signal 211 to a value of "3" in step 425.

Figure 17:
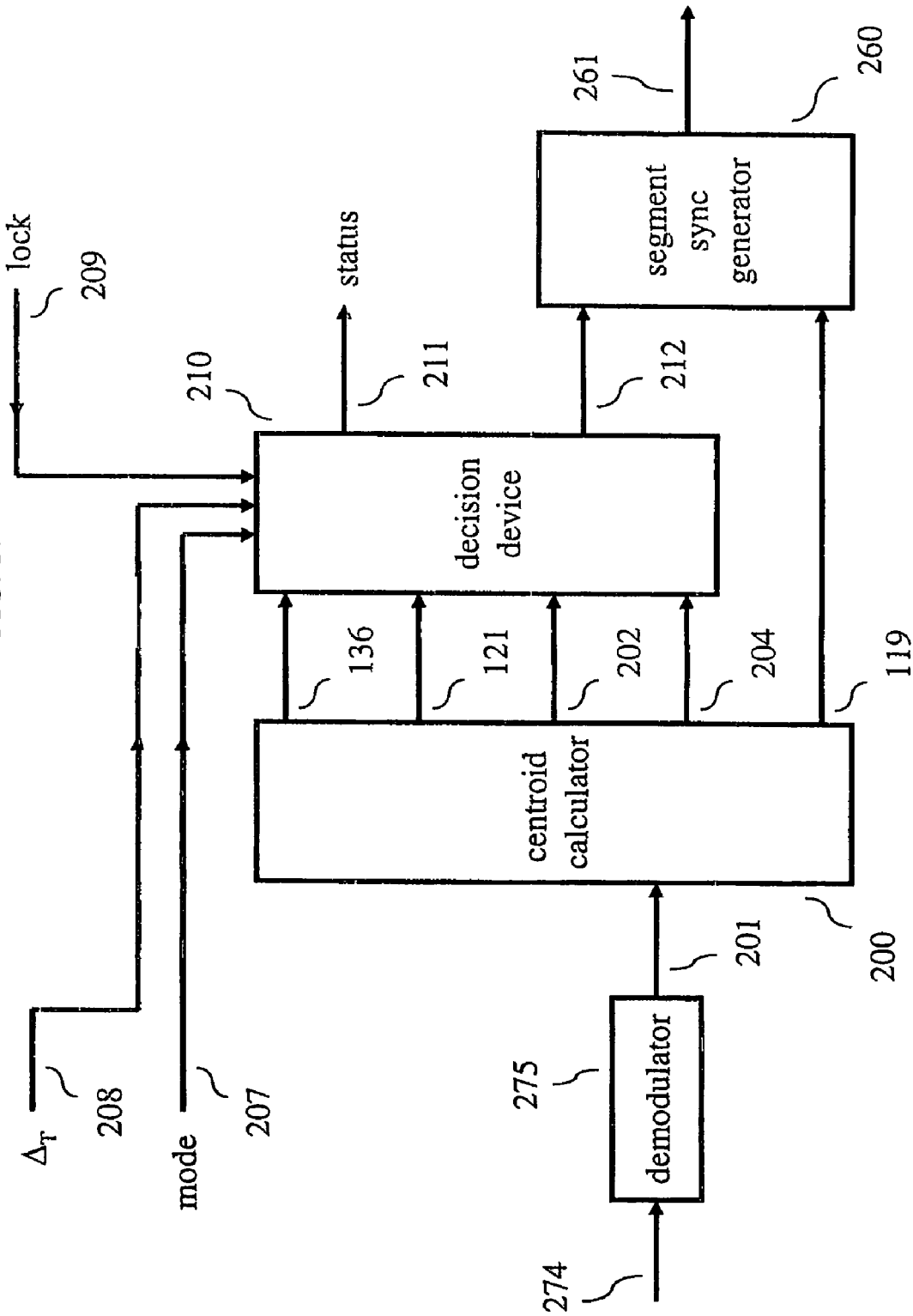
FIG. 17 shows another illustrative embodiment of a dual-mode sync generator for use in receiver 15 of FIG. 5.

Turning now to FIG. 17, another illustrative embodiment in accordance with the principles of the invention is shown. The embodiment shown in FIG. 17 is similar to that shown in FIG. 14 except that decision device 210 is not dependent on threshold signal 206.

Figure 18:
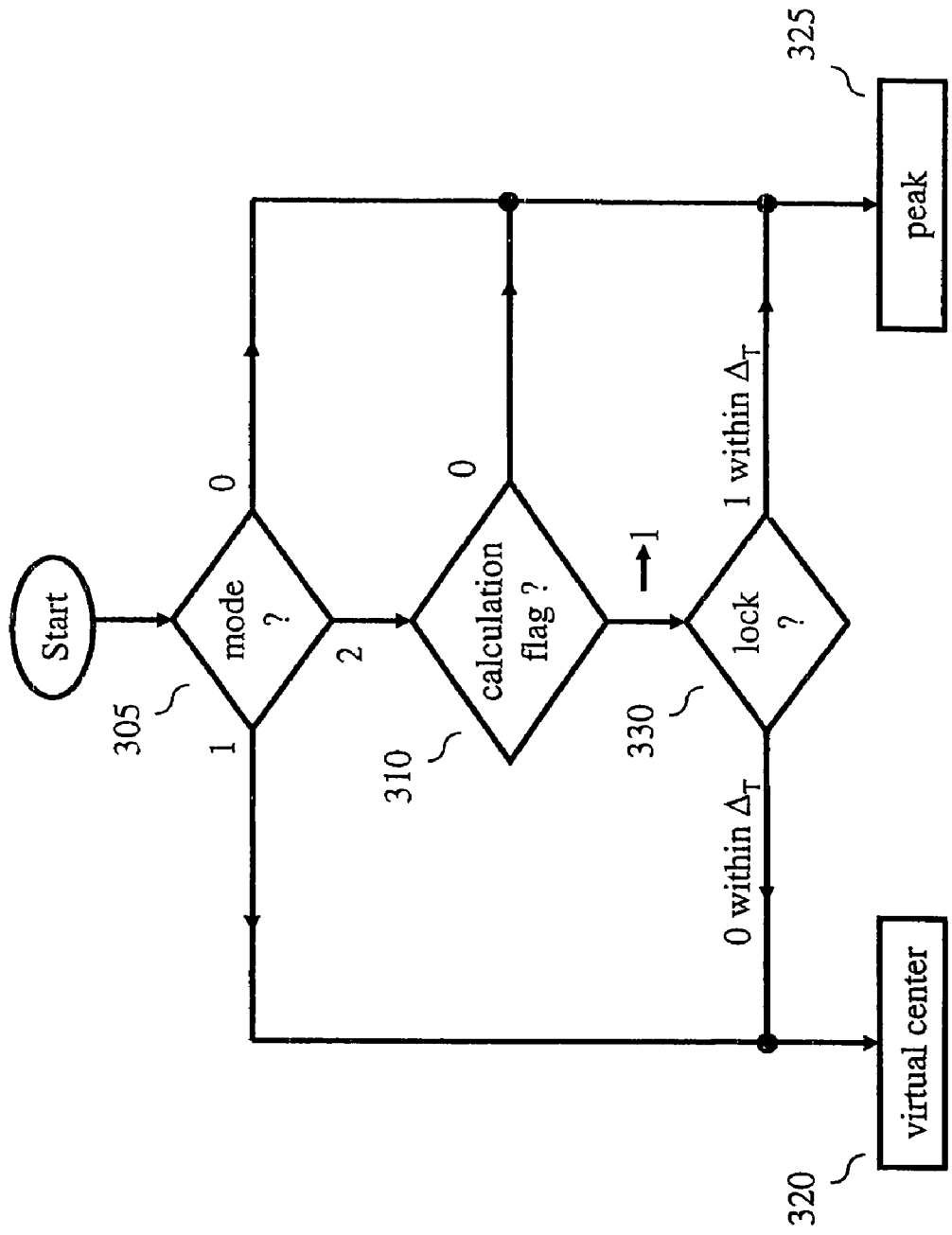
FIGS. 18 and 19 show illustrative flow charts for use in the dual-mode sync generator of FIG. 17.

In this embodiment, decision device 210 provides segment reference signal 212 as illustrated in the flow chart of FIG. 18. This flow chart is similar to the flow chart shown in FIG. 15. In step 305 of FIG. 18, decision device 210 determines the current mode of operation from mode signal 207. If mode signal 207 is representative of a value of "0", then decision device 210 provides peak signal 121 as segment reference signal 212 in step 325. On the other hand, if mode signal 207 is representative of a value of "1", then decision device 210 provides virtual center value 136 as segment reference signal 212 in step 320. Finally, if mode signal 207 is representative of a value of "2", then decision device 210 evaluates the calculation flag signal 202 in step 310. If the value of calculation flag signal 202 is equal to "0", e.g., centroid calculator 200 has not yet finished determining the virtual center value, then decision device 210 provides peak signal 121 as segment reference signal 212 in step 325. However, once the value of calculation flag signal 202 transitions to "1", (a transition to "1" is represented by the symbol "→1" in FIG. 18), i.e., the calculation is now complete, then decision device 210 evaluates lock signal 209 in step 330. If the value of lock signal 209 is equal to a "1" and occurs within the $\Delta_T$ 208 time period (e.g., the equalizer has locked within this time period, which may start being computed as the calculation flag signal 202 transitions to "1") then decision device 210 provides peak signal 121 as segment reference signal 212 in step 325. However, if the value of lock signal 209 is equal to a "0" and occurs within the $\Delta_T$ 208 time period (the equalizer has not yet locked within the time period) then decision device 210 provides virtual center value 136 as segment reference signal 212 in step 320.

Figure 19:
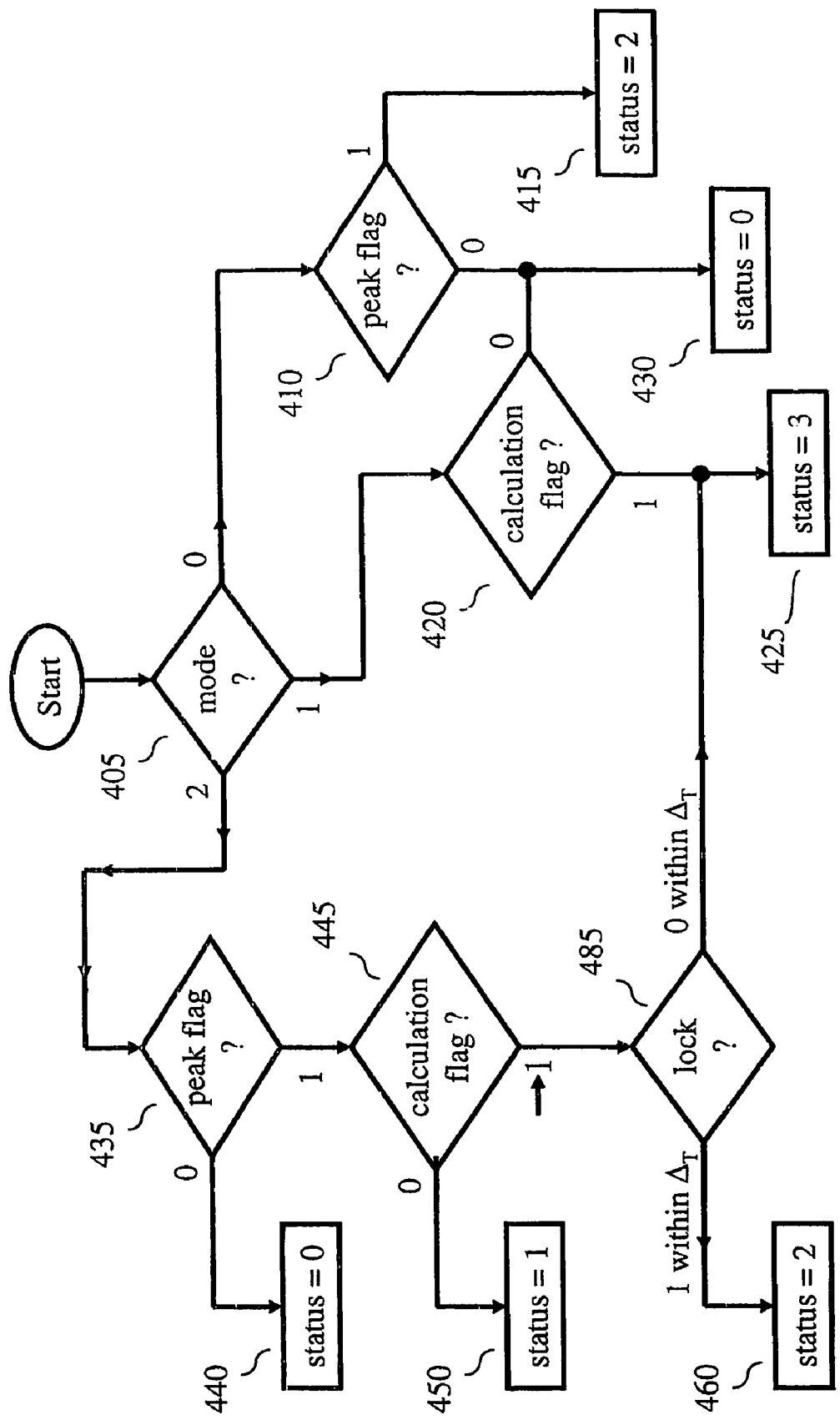

Referring now to FIG. 19, decision device 210 provides status signal 211 as illustrated in the flow chart shown therein. This flow chart is similar to the flow chart shown in FIG. 16. Decision device 210 first determines the mode of operation in step 405. If mode signal 207 is representative of a value of "0", (peak signal 121 is being used to generate segment reference signal 212) then decision device 210 evaluates peak flag signal 204 in step 410. If the value of peak flag signal 204 is equal to a "1", i.e., the peak search is complete, then decision device 210 sets status signal 211 to a value of "2" in step 415. However, if the value of peak flag signal 204 is equal to a "0", i.e., the peak search is not complete, then decision device 210 sets status signal 211 to a value of "0" in step 430. On the other hand, if mode signal 207 is representative of a value of "1", (virtual center value 136 is being used to generate segment reference signal 212) then decision device 210 evaluates calculation flag signal 202 in step 420. If the value of calculation flag signal 202 is equal to a "1", i.e., the calculation is complete, then decision device 210 sets status signal 211 to a value of "3" in step 425. However, if the value of calculation flag signal 202 is equal to a "0", i.e., the calculation is not complete, then decision device 210 sets status signal 211 to a value of "0" in step 430. Finally, if mode signal 207 is representative of a value of "2", (either peak signal 121 or virtual center value 136 is used for generating the segment sync signal) then decision device 210 evaluates peak flag signal 204 in step 435. If the value of peak flag signal 204 is equal to a "0", i.e., the peak search is not complete, then decision device 210 sets status signal 211 to a value of "0" in step 440. However, if the value of peak flag signal 204 is equal to a "1", i.e., the peak search is complete, then decision device 210 evaluates calculation flag 202 in step 445. If the value of calculation flag signal 202 is equal to a "0", i.e., the calculation is not complete, then decision device 210 sets status signal 211 to a value of "1" in step 450. However, once the value of calculation flag signal 202 transitions to "1", (a transition to "1" is represented by the symbol "→1" in FIG. 19), i.e., the calculation is now complete, then decision device 210 evaluates lock signal 209 in step 485. If the value of lock signal 209 is equal to a "1" and occurs within the $\Delta_T$ 208 time period (e.g., the equalizer has locked within this time period, which may start being computed as the calculation flag signal 202 transitions to "1") then decision device 210 sets status signal 211 to a value of "2" in step 460. However, if the value of lock signal 209 is equal to a "0" and occurs within the $\Delta_T$ 208 time period (the equalizer has not yet locked within the time period) then decision device 210 sets status signal 211 to a value of "3" in step 425.

All the illustrative embodiments of a dual-mode sync generator described herein can be based on any sync signal. The correlator compares the input data with the sync signal of choice. In the context of ATSC-DTV, some candidates are the segment sync signal or the frame sync signal. For these types of sync signals the difference is in the choice of the correlator and in the size of the integrators to accommodate the type and size of the sync signal.

Likewise, all of the illustrative embodiments described herein in accordance with the principles of the invention can be based on any type training signal of any digital communications system. The inventive concept may be extended to any communication system subject to linear distortion.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in a stored-program-controlled processor, e.g., a digital signal processor, which executes associated software, e.g., corresponding to one or more of the steps shown in, e.g., FIG. 7, etc. Further, although shown as elements bundled within TV set 10, the elements therein may be distributed in different units in any combination thereof. For example, receiver 15 of FIG. 5 may be a part of a device, or box, such as a set-top box that is physically separate from the device, or box, incorporating display 20, etc. Also, it should be noted that although described in the context of terrestrial broadcast, the principles of the invention are applicable to other types of communications systems, e.g., satellite, cable, etc. It is therefore to be understood that numerous modifications may be made to the illustrative embodiments and that other arrangements may be devised without departing from the spirit and scope of the present invention as defined by the appended claims.

The invention claimed is:

1. A receiver, comprising:
   an equalizer that has at least two coefficient modes of operation;
   a sync generator for generating a synchronization signal from a received signal and for providing a status signal; and
   a controller for setting the equalizer in one of the at least two coefficient modes of operation as a function of the status signal;
   wherein in a first coefficient mode, the equalizer starts with a preset non-zero value in at least one tap; while in a second coefficient mode, the equalizer starts such that all taps are set equal to a same value;
   wherein in the first coefficient mode the equalizer starts with the preset non-zero value in said at least one tap and the equalizer equalizes a received signal in accordance with a blind mode of operation and a decision-directed mode of operation; wherein the equalizer transits from the blind mode to the decision-directed mode as a function of a mean square error estimate of an output signal from the equalizer;
   wherein the sync generator comprises at least two modes of operation, wherein in a first mode of operation the sync generator generates the synchronization signal as a function of a channel virtual center signal and in a second mode of operation the sync generator generates the synchronization signal as a function of a correlation signal.

2. The receiver of claim 1, wherein the equalizer comprises a feedback filter for which the feedback filter input signal under the blind mode or the decision directed mode comprises at least one of: the equalizer output signal, a slicer output signal or an external input signal.

3. The receiver of claim 1, wherein in the second coefficient mode the equalizer starts such that all taps are set equal to a value of zero.

4. The receiver of claim 1, wherein in the first coefficient mode the at least one tap is a main tap of the equalizer.

5. The receiver of claim 1, further comprising:
   a processor for setting the equalizer in one of the coefficient modes of operation as a function of a received signal.

6. The receiver of claim 5, wherein the received signal represents an ATSC-DTV (Advanced Television Systems Committee-Digital Television) signal.

7. The receiver of claim 5, wherein the processor further controls the operation of the equalizer from initialization to tap adaptation.

8. The receiver of claim 1, wherein the synchronization signal represents an ATSC-DTV (Advanced Television Systems Committee-Digital Television) segment sync signal.

9. The receiver of claim 1, wherein the synchronization signal represents an ATSC-DTV (Advanced Television Systems Committee-Digital Television) frame sync signal.

10. The receiver of claim 1, further comprising:
    a centroid calculator responsive to a demodulated signal for providing the channel virtual center signal and the correlation signal.

11. The receiver of claim 1, further comprising:
    a correlator responsive to a demodulated signal for providing the correlation signal, which is representative of a correlation between a demodulated signal and a data pattern representing the synchronization signal.

12. The receiver of claim 1, further comprising:
    a centroid calculation loop for providing the channel virtual center signal as a function of a data pattern conveyed within a demodulated signal, wherein the data pattern is representative of the synchronization signal.

13. The receiver of claim 1, wherein the sync generator generates the synchronization signal as a function of a difference between a value of the channel virtual center signal and a value that is a function of the correlation signal.

14. The receiver of claim 1, wherein the sync generator generates the synchronization signal as a function of a lock signal, the lock signal representing a lock status of the equalizer.

15. The receiver of claim 1, wherein the sync generator generates the synchronization signal as a function of a lock signal occurring within a time interval, $\Delta T$, the lock signal representing a lock status of the equalizer.

16. The receiver of claim 1, wherein in the first coefficient mode the at least one tap is a predetermined feed-forward filter tap of the equalizer.

17. A method for use in a receiver, the method comprising:
    setting an equalizer to one of a number of coefficient modes of operation; and equalizing a signal in accordance with the set coefficient mode;
providing a status signal from a sync generator; and
wherein the setting step sets the equalizer in one of said number of coefficient modes of operation as a function of the status signal;
wherein the providing step includes the steps of:
providing a synchronization signal in a first mode as a function of a channel virtual center signal; and
providing the synchronization signal in a second mode as a function of a correlation signal;
wherein in a first coefficient mode, the equalizer starts with a preset non-zero value in at least one tap; while in a second coefficient mode, the equalizer starts such that all taps are set equal to a same value;
wherein in the first coefficient mode the equalizer starts with the preset non-zero value in said at least one tap and the equalizing step includes;
equalizing a received signal in accordance with a blind mode of operation; and
equalizing the received signal in accordance with a decision-directed mode of operation;
wherein the equalizer transits from the blind mode to the decision-directed mode as a function of a mean square error estimate of an output signal of the equalizer.

18. The method of claim 17, wherein at least one equalizing step comprises a feedback filtering step for filtering an input signal, wherein the input signal comprises at least one of: the equalizer output signal, a slicer output signal or an external input signal.

19. The method of claim 17, wherein in the second coefficient mode the equalizer starts such that all taps are set equal to a value of zero.

20. The method of claim 17, wherein in the first coefficient mode the at least one tap is a main tap of the equalizer.

21. The method of claim 17, wherein the setting step sets the equalizer in one of the coefficient modes of operation as a function of a received signal.

22. The method of claim 21, wherein the received signal represents an ATSC-DTV (Advanced Television Systems Committee-Digital Television) signal.

23. The method of claim 21, wherein the setting step further sets the equalizer in initialization or tap adaptation as a function of the received signal.

24. The method of claim 17, wherein the setting step further sets the equalizer in initialization or tap adaptation as a function of the status signal.

25. The method of claim 17, wherein the synchronization signal represents an ATSC-DTV (Advanced Television Systems Committee-Digital Television) segment sync signal.

26. The method of claim 17, wherein the synchronization signal represents an ATSC-DTV (Advanced Television Systems Committee-Digital Television) frame sync signal.

27. The method of claim 17, further comprising:
processing a demodulated signal to provide the channel virtual center signal and the correlation signal.

28. The method of claim 17, further comprising:
providing the correlation signal, which is representative of a correlation between a demodulated signal and a data pattern representing the synchronization signal.

29. The method of claim 17, further comprising:
providing the channel virtual center signal as a function of a data pattern conveyed within a demodulated signal, wherein the data pattern is representative of the synchronization signal.

30. The method of claim 17, further comprising
providing the synchronization signal as a function of a difference between a value of the channel virtual center signal and a value that is a function of the correlation signal.

31. The method of claim 17, further comprising
providing the synchronization signal as a function of a lock signal, the lock signal representing a lock status of the equalizer.

32. The method of claim 17, further comprising
providing the synchronization signal as a function of a lock signal occurring within a time interval, $\Delta T$, the lock signal representing a lock status of the equalizer.

33. The method of claim 17, wherein in the first coefficient mode the at least one tap is a predetermined feed-forward filter tap of the equalizer.

34. A receiver, comprising:
an equalizer that has at least two coefficient modes of operation;
wherein in a first coefficient mode, the equalizer starts with a preset non-zero value in at least one tap; while in a second coefficient mode, the equalizer starts such that all taps are set equal to a same value; wherein in the second coefficient mode the equalizer starts such that all taps are set equal to the same value and the equalizer equalizes a signal in accordance with a training mode of operation; a blind mode of operation; and a decision-directed mode of operation; wherein the equalizer transits between the training mode, the blind mode and the decision-directed mode as a function of a mean square error estimate of an output signal of the equalizer.

35. The receiver of claim 34, wherein the equalizer comprises a feedback filter for which the feedback filter input signal under the blind mode or the decision directed mode is at least one of: the equalizer output signal, a slicer output signal or an external input signal.

36. A method for use in a receiver, the method comprising:
setting an equalizer to one of a number of coefficient modes of operation; and
equalizing a signal in accordance with the set coefficient mode;
wherein in a first coefficient mode, the equalizer starts with a preset non-zero value in at least one tap; while in a second coefficient mode, the equalizer starts such that all taps are set equal to a same value;
wherein in the second coefficient mode the equalizer starts such that all taps are set equal to the same value and the equalizing step includes;
equalizing the received signal in accordance with a training mode of operation;
equalizing the received signal in accordance with a blind mode of operation; and
equalizing the received signal in accordance with a decision-directed mode of operation;
wherein the equalizer transits between the training mode, the blind mode and the decision-directed mode as a function of a mean square error estimate of an output signal of the equalizer.

37. The method of claim 36, wherein at least one equalizing step comprises a feedback filtering step for filtering an input signal, wherein the input signal comprises at least one of: the equalizer output signal, a slicer output signal or an external input signal.

* * * * *